United States Patent
Davis

(10) Patent No.: US 10,406,560 B1
(45) Date of Patent: Sep. 10, 2019

(54) DISC FOR USE IN DISC SCREEN

(71) Applicant: Nicholas Davis, San Diego, CA (US)

(72) Inventor: Nicholas Davis, San Diego, CA (US)

(73) Assignee: CP Manufacturing, Inc., San Diego, CA (US)

( * ) Notice: Subject to any disclaimer, the term of this patent is extended or adjusted under 35 U.S.C. 154(b) by 0 days.

(21) Appl. No.: 16/193,815

(22) Filed: Nov. 16, 2018

Related U.S. Application Data

(60) Provisional application No. 62/739,692, filed on Oct. 1, 2018.

(51) Int. Cl.
  *B07B 1/15* (2006.01)
  *B07B 1/14* (2006.01)

(52) U.S. Cl.
  CPC .............. *B07B 1/15* (2013.01); *B07B 1/145* (2013.01)

(58) Field of Classification Search
  CPC .... B07B 1/14; B07B 1/15; B07B 1/16; Y10T 29/49554
  USPC ................... 209/271, 667, 669, 671, 672
  See application file for complete search history.

(56) References Cited

U.S. PATENT DOCUMENTS

| | | | | |
|---|---|---|---|---|
| 2,973,093 A * | 2/1961 | Erickson | .................. | B07B 1/14 198/787 |
| 3,028,957 A * | 4/1962 | Conway | .................. | B07B 1/15 209/672 |
| 3,306,441 A * | 2/1967 | Sanders | .................. | B02C 4/00 209/233 |
| 3,747,149 A * | 7/1973 | Tatyanko | .................. | A01D 17/06 15/3.11 |
| 4,266,676 A * | 5/1981 | Ruckstuhl | .................. | B07B 1/15 209/672 |
| 4,430,210 A * | 2/1984 | Tuuha | .................. | B07B 1/15 209/234 |
| 4,471,876 A * | 9/1984 | Stevenson, Jr. | .................. | A01D 17/06 15/3.11 |
| 4,953,712 A * | 9/1990 | Meester | .................. | B07B 1/15 198/663 |
| 6,149,018 A * | 11/2000 | Austin | .................. | B07B 1/15 209/667 |
| 7,261,209 B2 * | 8/2007 | Duncan | .................. | B07B 1/15 209/271 |
| 8,939,292 B2 * | 1/2015 | Doppstadt | .................. | B07B 1/14 209/243 |
| 8,991,616 B2 * | 3/2015 | Parr | .................. | B07B 1/15 209/667 |
| 9,027,762 B2 * | 5/2015 | Davis | .................. | B07B 1/16 209/672 |

(Continued)

*Primary Examiner* — Joseph C Rodriguez
(74) *Attorney, Agent, or Firm* — Manuel de la Cerra

(57) ABSTRACT

A disc for use in a disc screen is disclosed. The disc has a longitudinal axis and includes a hub extending a length along the longitudinal axis. The longitudinal axis is coaxial with the center of the hub and the hub further includes a hub surface, a major axis defined by a first cross section taken perpendicular to the longitudinal axis and through the center of the hub at and a minor axis defined by a second cross section taken perpendicular to the longitudinal axis and through the center of the hub. The first cross section is longer than the second cross section, and the first cross section is substantially orthogonal to the second cross section. A helical ridge structure extends away from hub surface and twists at least 360 degrees about the longitudinal axis for the length.

24 Claims, 33 Drawing Sheets

(56) References Cited

U.S. PATENT DOCUMENTS 9,238,254 B1 * 1/2016 Davis ................ B07B 1/15
9,849,484 B2 * 12/2017 Guenther ............ E02F 7/06

* cited by examiner

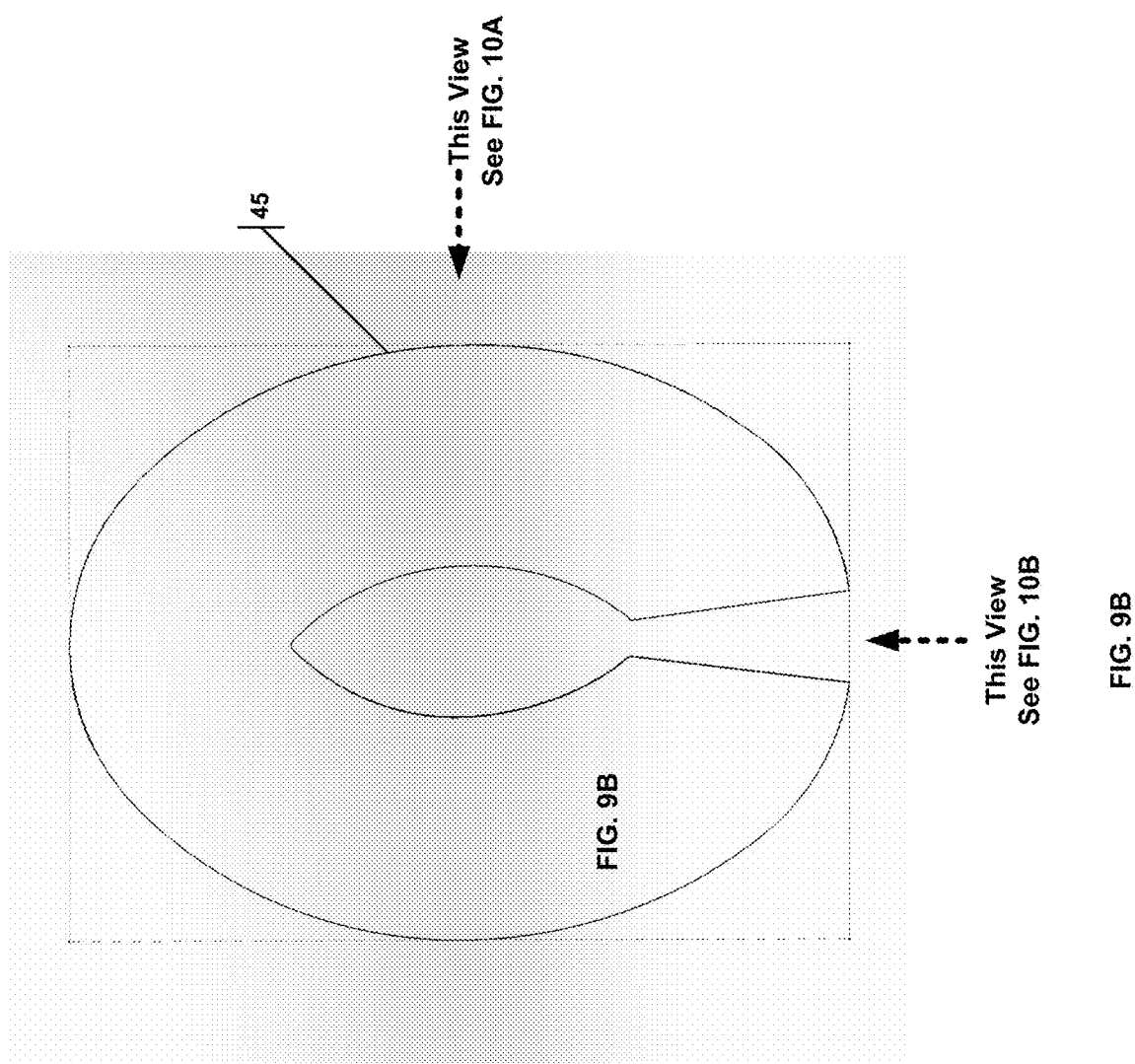

DISC FOR USE IN DISC SCREEN

2.0 RELATED APPLICATIONS

This application claims priority to U.S. Patent Application 62/739,692 filed on Oct. 1, 2018, the contents of which is incorporated herein by reference.

1.0 TECHNICAL FIELD

The present invention relates generally to machines used to sort materials and mixed recyclable materials.

3.0 BACKGROUND

A bulk material screening device is a device which separates input material by size or shape. These screening devices are used in industries such as mining and aggregates, forestry, agriculture, and recycling to separate inbound materials into more valuable products. For example, in the solid waste and recycling industry, high value corrugated cardboard containers tend to be of a larger size than other recyclable material, and so can be separated from other materials based on this large size. Traditional screening devices include trommels, disc screen, and vibratory screens.

Trommel screens and vibratory screens utilize a static screening surface, consisting of a steel or polymer material with holes of a certain size, and then bring material into contact with the screening surface such that materials smaller than the holes pass through the screening surface and material larger than the holes do not. These types of static screens are subject to operational and maintenance hazards when material builds up in or around the holes of the screening surface. This typically happens due to wet or stringy material. As material builds up around the holes, the hole size becomes smaller and the nature of the screened material changes. Once the holes become too small, it becomes necessary to stop the machine so the screening surface can be cleaned.

A disc screen consists of a series or parallel rotors or shafts, with attached discs or stars, turned in concert such that a sufficiently consistent opening between the rotors is achieved as they are turned. Screening is achieved by constructing the rotors and discs such that the desired opening is achieved. The rotation of the rotors also drives the material forward, making it easier to bring new material into contact with the screening surface, allowing for smaller and cheaper machines to be used to accomplish the same task as passive screens. This type of active screening surface is not subject to the buildup of wet materials as described above. However, the rotors are extremely prone to wrapping on stringy materials. As each rotor is increasingly wrapped, the opening of the screening surface decreases due to wrapped material. Once the openings become too small, it is necessary to clean the machine by cutting the wrappings off with a chisel or knife. The prevalence of plastic bags and other stringy material within solid waste is a consistent challenge for the waste and recycling industry when using disc screens.

It is generally understood that many of the maintenance hazards for disc screens stop being an issue as the opening of the screen gets small enough that stringy material can no longer fit through the opening. This typically occurs at an opening size of approximately two inches. However, a screen with this size opening typically cannot accept any material larger than six inches or risk having the openings covered, or blinded, by the larger material, meaning these disc screens that don't suffer maintenance issue typically are toward the end of a material processing line after larger items have been removed.

When the aforementioned machines are used in particularly difficult material stream that present high amounts of maintenance hazards, there is often a conveyor belt configured to allow human sortation of materials placed before any machines to remove said hazards. This is typically called a "pre-sort". Pre-sorting material before mechanical process is expensive as it takes many sorters to sift through the full burden depth of the material. Further, this pre-sort station is the most hazardous sort station to the human sorters as the receive all of the heterogeneous material. They are tasked with sorting large, heavy objects from in a moving pile, which can be up to 30" away from them, while avoiding being stabbed by broken glass, sharp metal objects, and other sharp objects such as used hypodermic needles that would typically be found in the small fraction of material. For this reason, most workers at a pre-sort station utilize Kevlar or similar gloves to protect themselves, but this makes it even more difficult to lift the intended items, requiring additional sorters and additional expense to achieve a sufficient pre-sort such that the material screening devices do not constantly break down.

Another type of active material screening device consists of a series of parallel augers with interleaved flights with consistent spacing such that the opening between auger shafts and flights creates a screening surface. An auger is a central shaft with a rotating helical blade attached to the radial surface. As a helix is necessarily a projection on the surface of a cylinder with a constant angle between the tangent of the projection and a central axis, augers are traditionally round. In the application of a screening device made out of augers, the roundness of the auger and consistent spacing of flights guarantees the adjacent augers do not collide. Auger screens are beneficial in certain industries, such as screening of solid waste materials, where wrapping and plugging of traditional screening devices is a problem. This is because as material wraps on the auger shaft, the flights of the adjacent augers pushes the wrapped material off the shaft and prevents plugging and jamming. However, as augers are constrained to a circular shape, the current state of the art in auger screens does not provide any bouncing motion or material agitation so material does not sift toward the screening surface, limiting applications to where material can be singulated or reducing screening efficiency compared to disc screens, requiring much larger machines to be used to accomplish the same task. Further, as taught by Gunther in EP 1570 919 B1, this machine is very sensitive to the material feed configuration, requiring the machine to be fed laterally with a high speed belt such that material is flung onto the machine, rather than dropped, to minimize the sorting inefficiencies of having no agitation.

It is not necessary to pre-sort an auger screen as it is with other screening devices, allowing it to be placed in front of the pre-sort. In the current state of the art, an auger screen with approximately an 8" opening is placed before the pre-sort to screen out small and potentially hazardous items. The pre sorters can then focus on the sorting of large items which are maintenance hazards without needing to worry about being stabbed by broken glass or hypodermic needles. This further allows fewer pre sorters to be used to accomplish the same task as a traditional pre-sort. However, the auger screen is not suitable for final screening of materials, such as a typical disc screen configured for the separation of old corrugated cardboard from mixed recyclables. These machines have an approximately 12"×12" opening with rotors on 20" centers and an amplitude of agitation of 2" to 5". The high amplitude is necessary as OCC, such as the box of a flat screen television, is large and flat compared to the other items being sorted, and so other items tend to ride on top of the pieces of OCC. Further, a traditional disc screen typically requires an amplitude of at least 5% of the maximum particle size in order to achieve sufficient sifting action, with higher ratios being better. As such, an OCC Disc Screen with a 2" amplitude would typically be used on items up to 40" in diameter in any one dimension. With no agitation, the auger screen cannot be used for the screening of cardboard as too many riders pass over the screen.

Wess teaches of another form of auger screen in U.S. Pat. No. 9,895,719. The auger flights in this machine consist of a series of "fingers" or "stars" protruding from a substrate. While in theory this will increase the surface speed of materials on the screen deck, the distal end of the fingers describe a circle and there is too little space between the fingers to provide agitation, so it doesn't solve the primary weakness of existing auger screens. Further, this shape creates a pinching hazard as the minimum distance between the helical shaped "flight: and the opposite substrate varies continuously and sharply. This creates an impinging motion between the two mechanical parts that has a risk of causing a hard jam in the machine if a hard object, such as a rock, falls behind a finger and is forced into the opposing substrate by the following finger. While this risk is relatively small for small openings screening devices and with the fingers placed tightly together, as the opening size is increased or the fingers are moved further apart, larger and larger items can fall into the pocket created when the minimum distance is at a maximum which can then be pinched by the following finger, creating a hard jam. As such, this limits the inventions to screening of small items, which are already screenable utilizing disc screens which have inherent agitation.

What is therefore needed is a auger-type disc for use in a disc screen that overcomes these deficiencies.

4.0 SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

The apparatus, systems, and methods described herein elegantly solve the problems presented above. An auger-type disc for use in a disc screen is disclosed. In a first embodiment, a disc for use in a disc screen is disclosed. The disc has a longitudinal axis and includes a hub extending a length along the longitudinal axis. The longitudinal axis is coaxial with the center of the hub and the hub further includes a hub surface, a major axis defined by a first cross section taken perpendicular to the longitudinal axis and through the center of the hub at and a minor axis defined by a second cross section taken perpendicular to the longitudinal axis and through the center of the hub. The first cross section is longer than the second cross section, and the first cross section is substantially orthogonal to the second cross section. A helical ridge structure extends away from hub surface and twists at least 360 degrees about the longitudinal axis for the length.

In a second embodiment, a multi lobe hub disc for use in a disc screen is disclosed. Specifically, the disc has a longitudinal axis and includes a hub extending a length along the longitudinal axis. The longitudinal axis is coaxial with the center of the hub and the hub further includes a hub surface, and a plurality of lobes N. Each lobe extends along the longitudinal axis and each lobe has a peak with a corresponding peak radius measured from the center of the hub to the hub surface at the peak. Each lobe has a peak radius that is substantially the same as the peak radius of the other lobes. Each lobe peak is 360/N degrees apart from each other, as defined by the angles formed between the peak radius of adjacent lobes. The peak radius is larger than the non-peak radius as defined by the measurement from the center of the hub to the hub surface between the peaks of adjacent lobes. A helical ridge structure extends away from hub surface and twists at least 360 degrees about the longitudinal axis for the length.

In either embodiment, the helical ridge may extend away from the hub surface at a constant height for the length of the helical ridge. The disc may be a split disc made of two or more parts. Those parts may be identical to each other and joined together in a staggered configuration to form the disc.

In either embodiment, a first and second disc may be placed adjacent and parallel to each other where the helical ridge structure from the first disc is interleaved with the helical ridge structure of the second disc. In the first embodiment, the first disc is positioned out of phase from the second disc by 90 degrees; and in the second embodiment, the first disc is positioned out of phase from the second disc by 90 degrees if N is even and 0 degrees if N is odd.

In either embodiment, the helical ridge of the first disc may form a gap width with the hub surface of the second disc, and when the two discs are rotated in the same direction, the width of the gap may remain substantially constant. The position of the gap may move along the direction of the longitudinal axis of the first disc. Further the position of the gap relative to the center of the hub of the first disc may not be substantially constant.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

5.0 BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. It will be understood that certain components and details may not appear in the figures to assist in more clearly describing the invention.

FIG. 9B is a view of a flat pattern for the helical ridge.

6.0 DETAILED DESCRIPTION OF EXAMPLE EMBODIMENTS

Figure 1A:
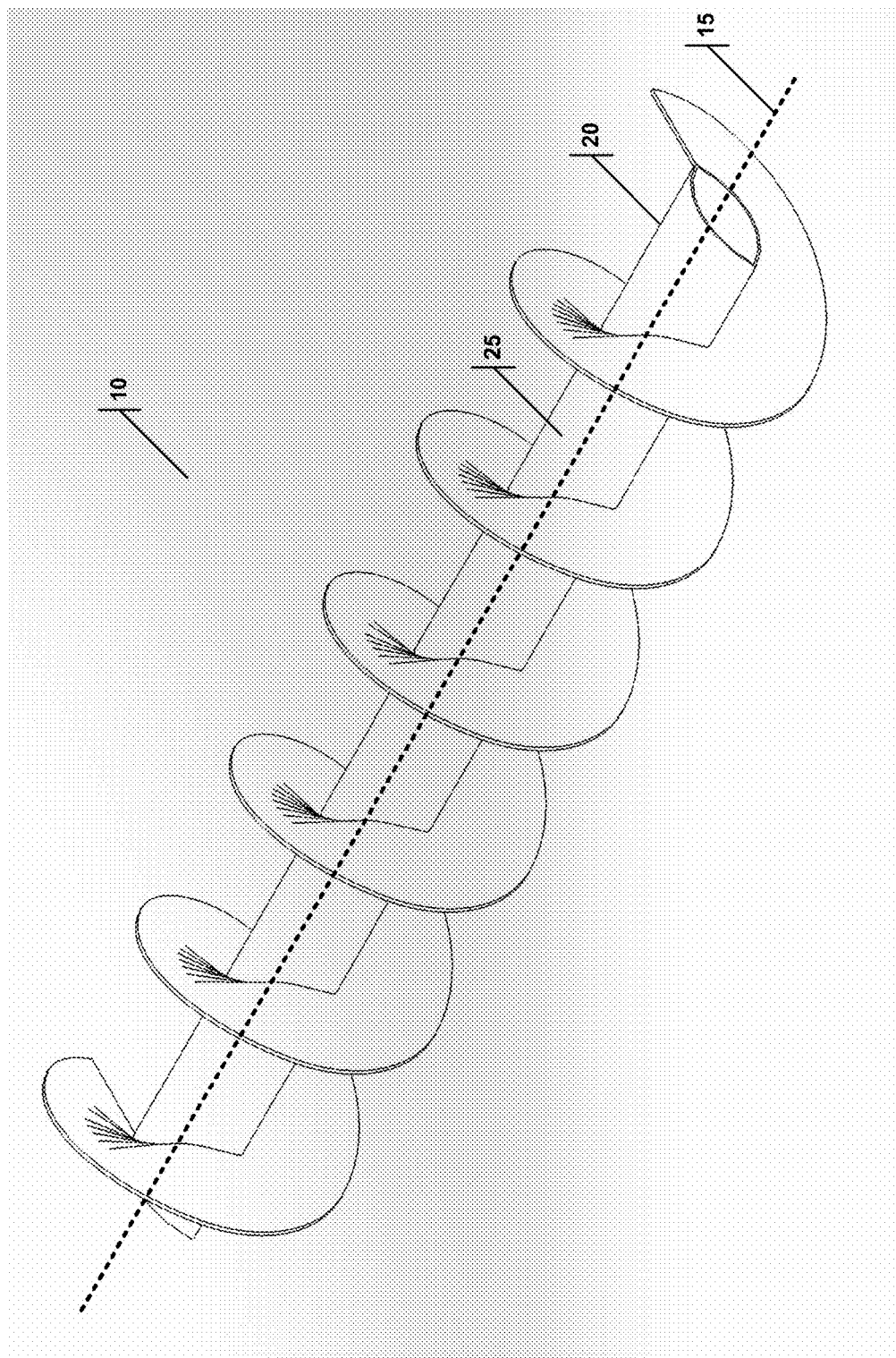
FIG. 1A is an isometric view of a single disc.
Figure 1B:
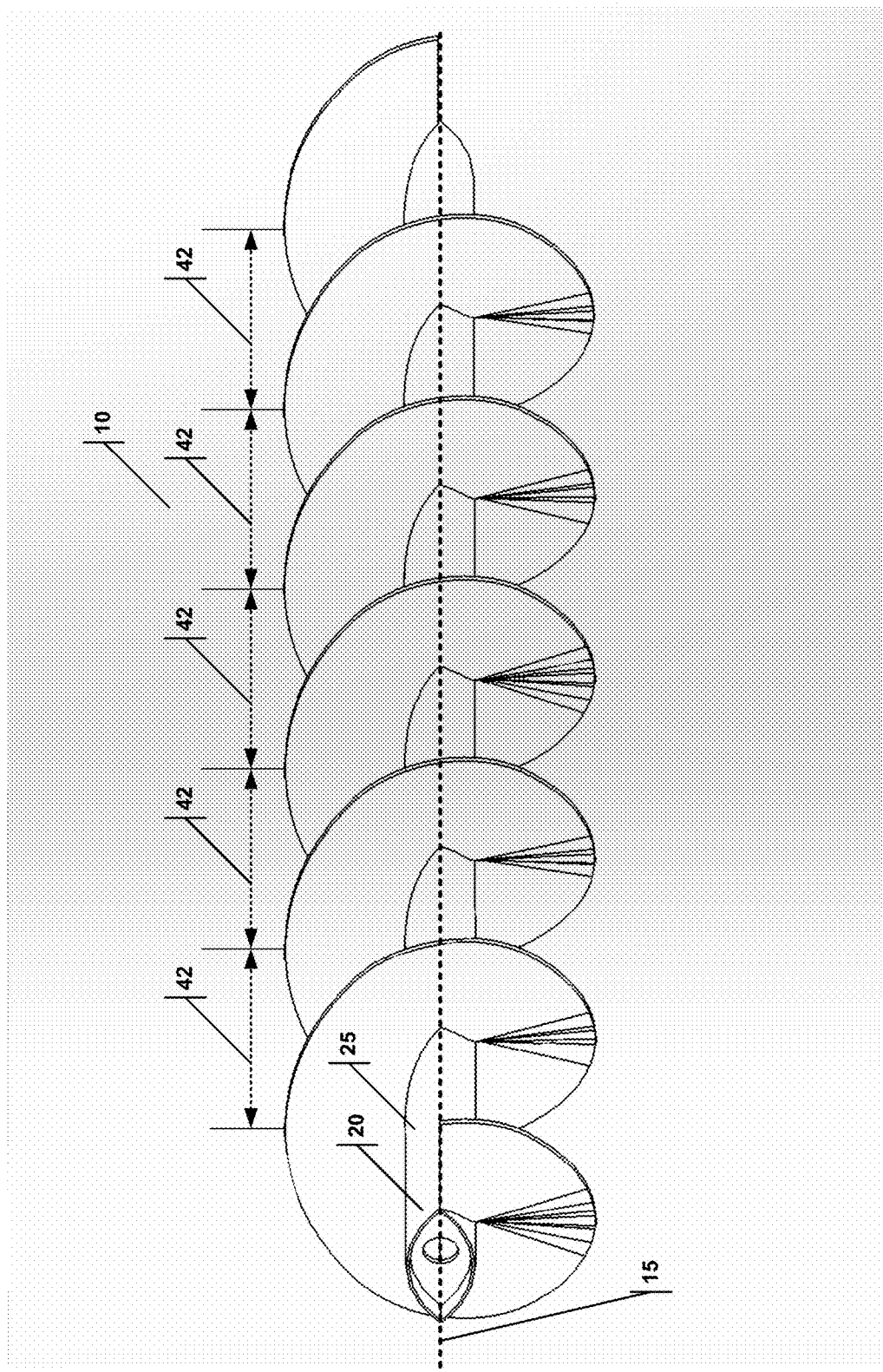
FIG. 1B is an elevated view of a disc.
Figure 1C:
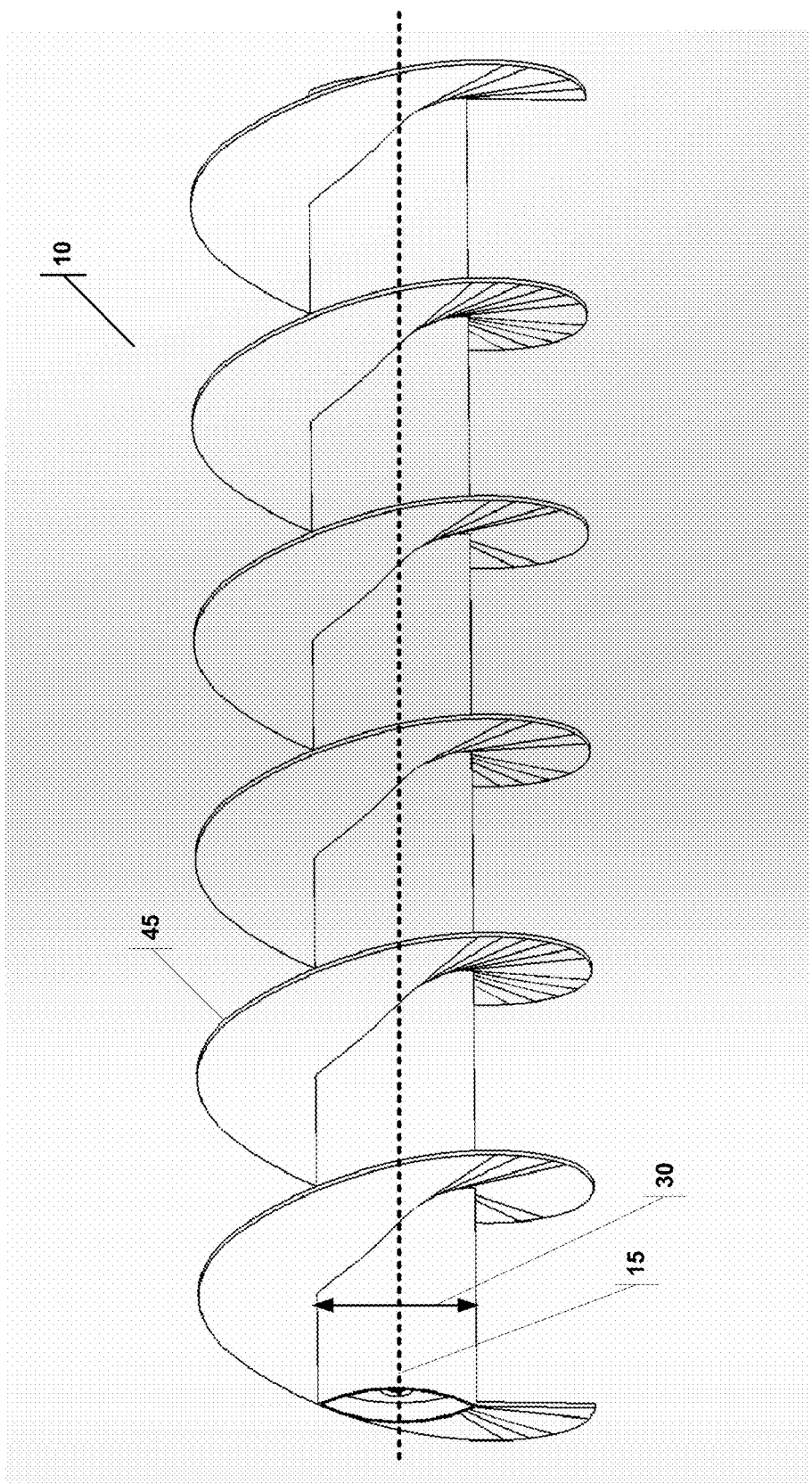
FIG. 1C is an elevated view of a disc 90-degrees phased from FIG. 1B.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

The following list of example features corresponds with FIGS. 1A-17B and is provided for ease of reference, where like reference numerals designate corresponding features throughout the specification and figures:

Disc 10
Longitudinal Axis 15
Hub 20
Hub Surface 25
Major Axis 30
Minor Axis 35
Right Angle 40
Helical Ridge 360 Degree Twist 42
Helical Ridge 45
Surface to Ridge Height 46
Disc Screen 47
First Adjacent Disc 50
Second Adjacent Disc 55
Amplitude Difference 57
Helical Ridge of First Disc 60
Helical Ridge of Second Disc 65
Interleaved Position 70
Relative Phased Between Discs 75
Gap 80
Gap Longitudinal Movement 82
Gap Lateral Movement 84
Rotational Direction 85
Motor 90
Power Shaft 95
Gear 100
Chain/Belt 105
First Set of Discs Sharing Phase with Each Other 110
Second Set of Disc Sharing Phase with Each Other 115

Material Fallout 120
Shaft Retention Plate 125
Disc Half 130
Inner Hub Keyed Surface/Hole 135
Three-Lobed Hub 140
Five-Lobed Hub 145
Peak 150
Peak Radius 155
Non-Peak radius 160

Referring to FIGS. 1A-3A, an auger-type disc 10 for use in a disc screen is shown. The disc 10 has a longitudinal axis 15 and includes a hub 20 extending a length along the longitudinal axis 15. The longitudinal axis 15 is coaxial with the center of the hub 20. The hub 20 includes a hub surface 25. Specifically with reference to FIG. 3A, a longitudinal view of a disc 10 is shown to more clearly illustrate the two lobe design that has a major axis 30 and a minor axis 35. The major axis 30 defined by a first cross section taken perpendicular to the longitudinal axis 15 and through the center of the hub. The minor axis 35 defined by a second cross section taken perpendicular to the longitudinal axis 15 and through the center of the hub. The first cross section of the major axis 30 is longer than the second cross section of the minor axis 35, and the first cross section is substantially orthogonal to the second cross section (shown by right angle 40). A helical ridge structure 45 extends away from hub surface 25 and twists at least 360 degrees about the longitudinal axis for the length. The twisting of the helical ridge 45 is shown in FIG. 1B, where the helical ridge is shown as twisting five 360-degrees twists (each labeled as 45).

Figure 2A:
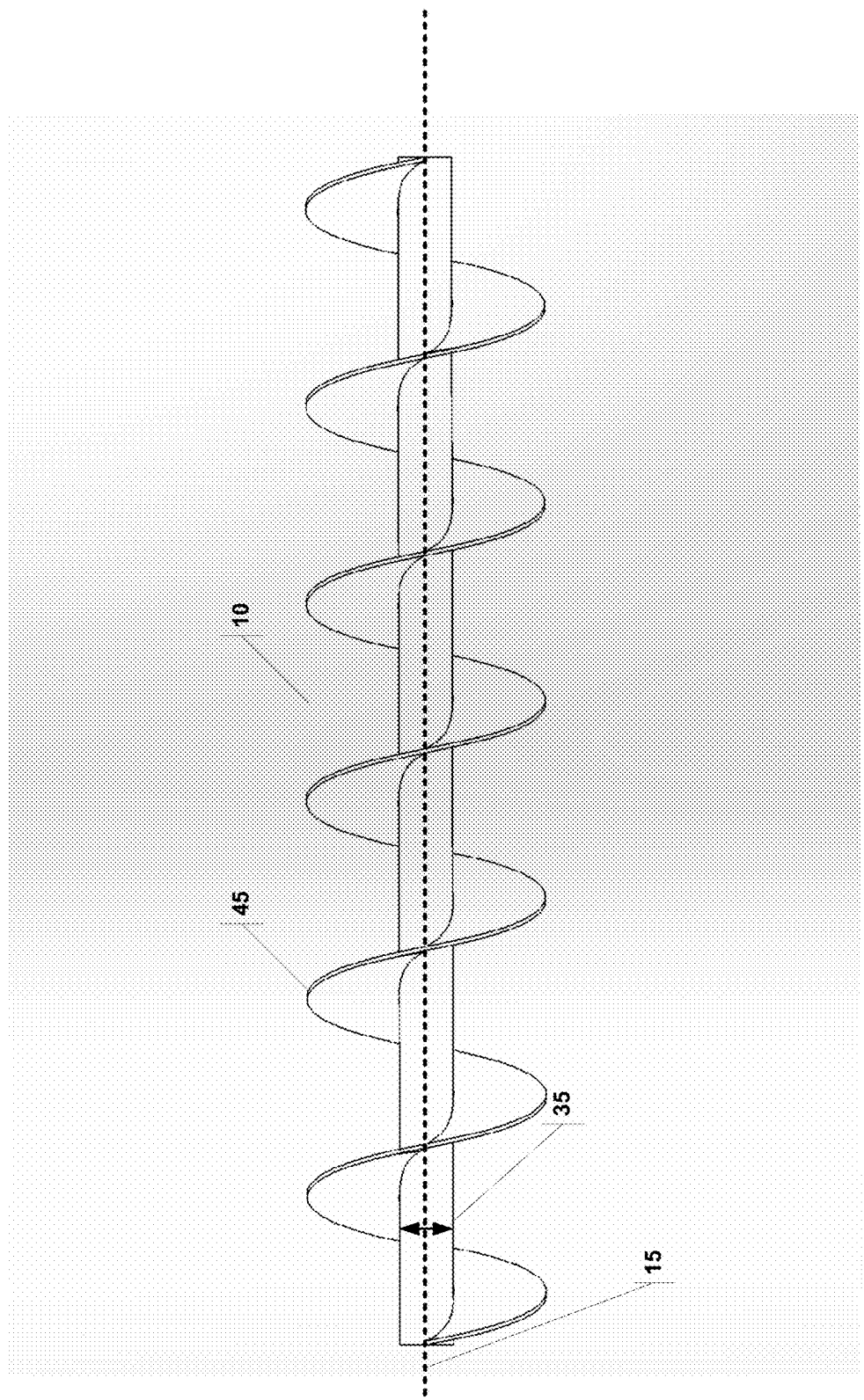
FIG. 2A is a top view of a disc with the minor axis facing up.
Figure 2B:
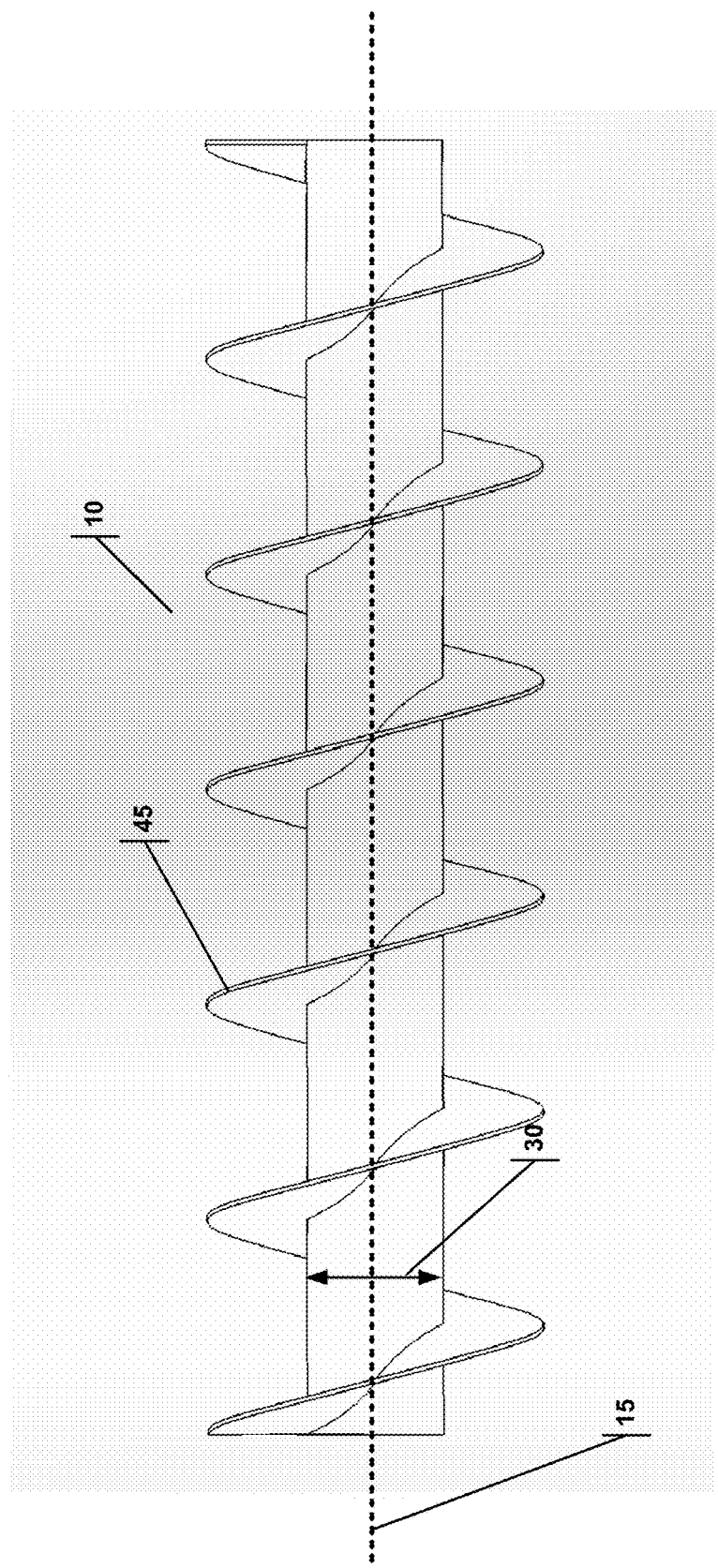
FIG. 2B is a top view of a disc with the major axis facing up.

The major axis 30 and minor axis 35 are shown in greater detail with reference to FIGS. 2A and 2B. FIG. 2A shows the disc 10 with the minor axis 35 in the plane of the paper. And rotating this structure 90-degrees as shown in FIG. 2B places the major axis 30 in the plane of the paper.

Figure 16A:
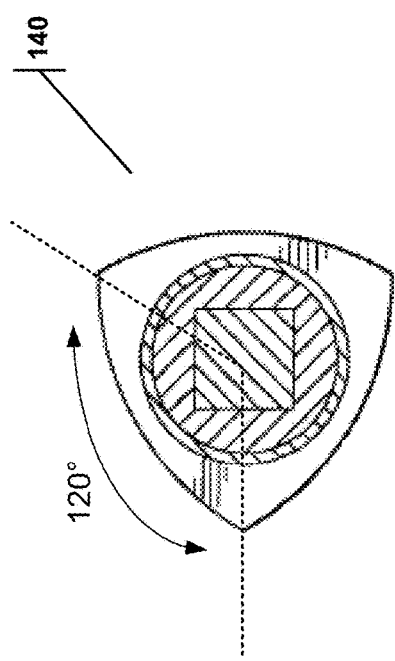
FIG. 16A illustrates a three lob hub that may be used with a helical ridge.
Figure 16B:
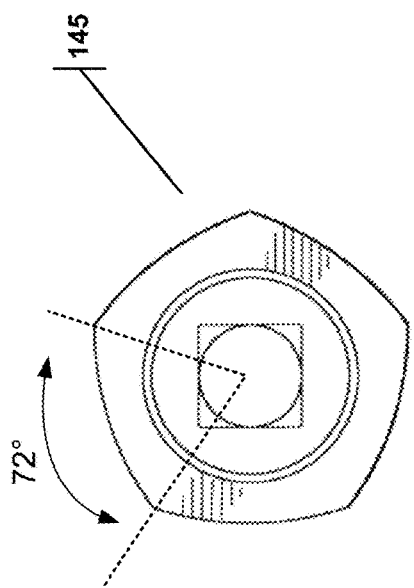
FIG. 16B illustrates a five lob hub that may be used with a helical ridge.

A more general form of describing the multi-lobe hub will now be disclosed. In this more general form, hubs with two or more lobes may be created. For example in FIGS. 16A and 16B a three-lobed hub 140 and a five-lobed hub 145 are shown. A helical ridge 45 may be applied to these hubs. Generalizing on the previously disclosed two-lobe design, FIGS. 3B-3D show a disc 10 with a longitudinal axis 15 and includes a hub 20 extending a length along the longitudinal axis 15. The longitudinal axis 15 is coaxial with the center of the hub 20 and the hub 20 further includes a hub surface 25, and a plurality of lobes N. In the case shown, N is equal to 2. Each lobe extends along the longitudinal axis 15 and each lobe has a peak 150 with a corresponding peak radius 155 measured from the center of the hub 20 to the hub surface 25 at the peak 150. Each lobe has a peak radius that is substantially the same as the peak radius of the other lobes and each lobe peak 150 is 360/N degrees apart from each other, as defined by the angles formed between the peak radius of adjacent lobes. As shown in FIG. 3D, the peaks 150 are 360/2, or 180 degrees apart. In FIG. 16A the three lobe hub 140 has three peaks at 360/3 (120 degrees apart) and in FIG. 16B the five-lobed hub 145 has five peaks at 360/5 (72 degrees apart).

The peak radius 155 is larger than the non-peak radius 160 as defined by the measurement from the center of the hub 20 to the hub surface 25 between the peaks 150 of adjacent lobes. A helical ridge structure 45 extends away from hub surface 25 and twists at least 360 degrees about the longitudinal axis 15 for the length.

Figure 3A:
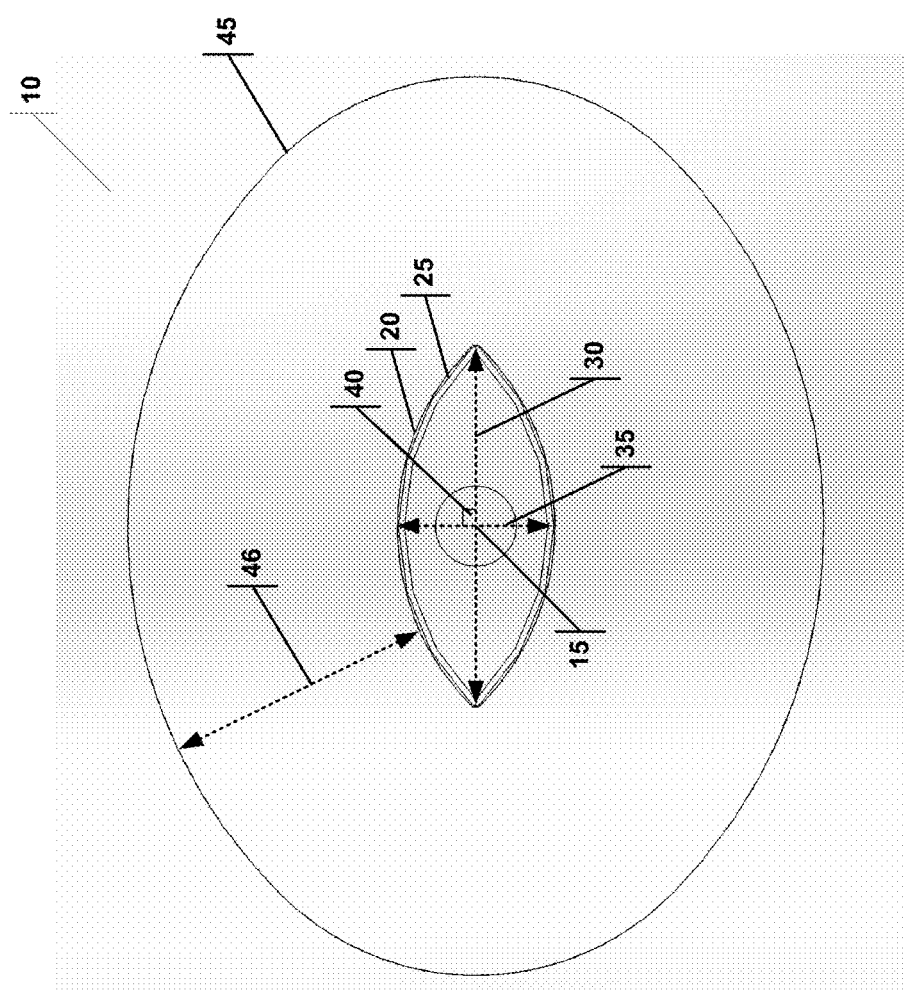
FIG. 3A is a longitudinal view of a disc.
Figure 3B:
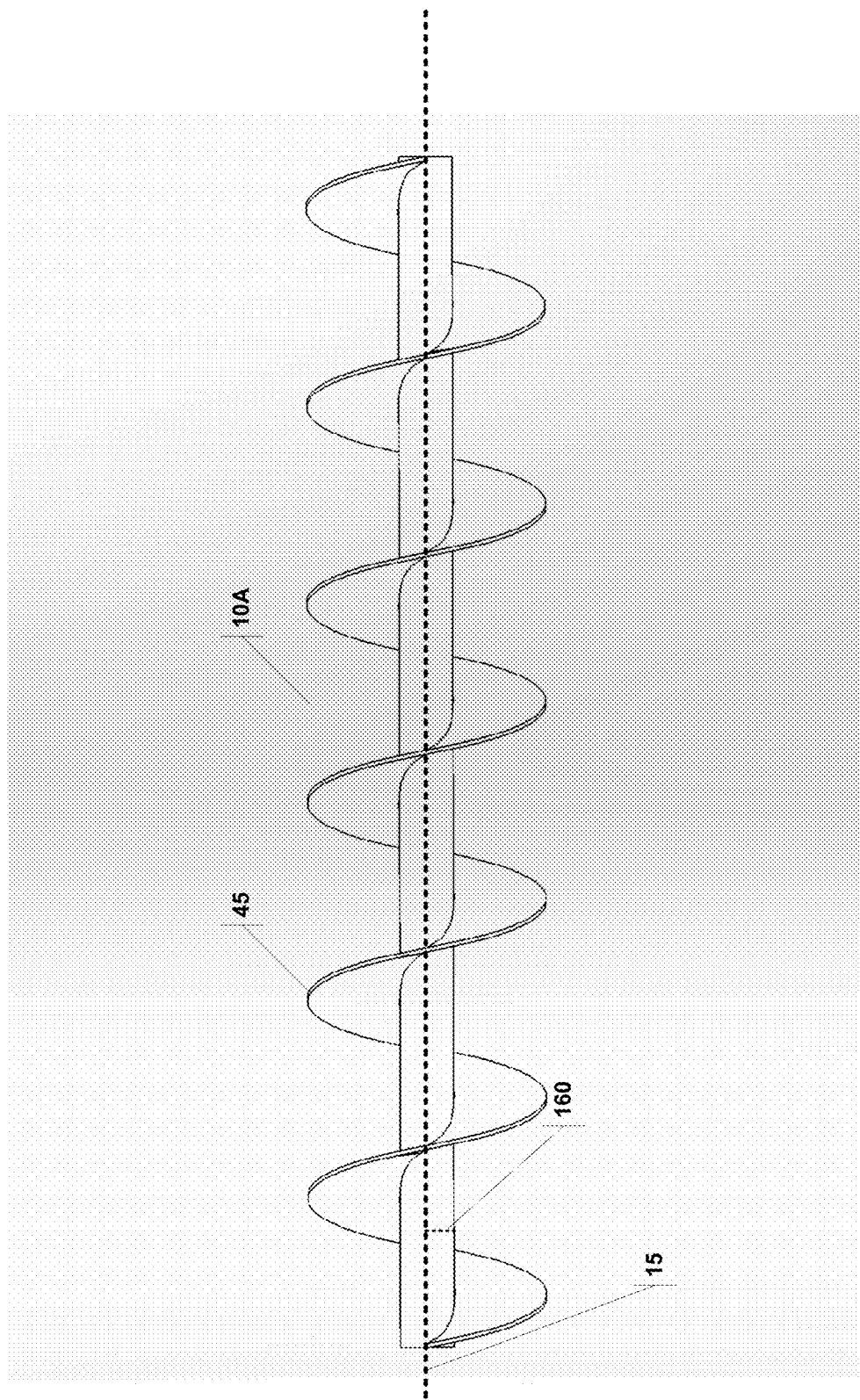
FIG. 3B is a top view of a multi-lobe disc with the smaller axis facing up, presented for a more generalized case.
Figure 3C:
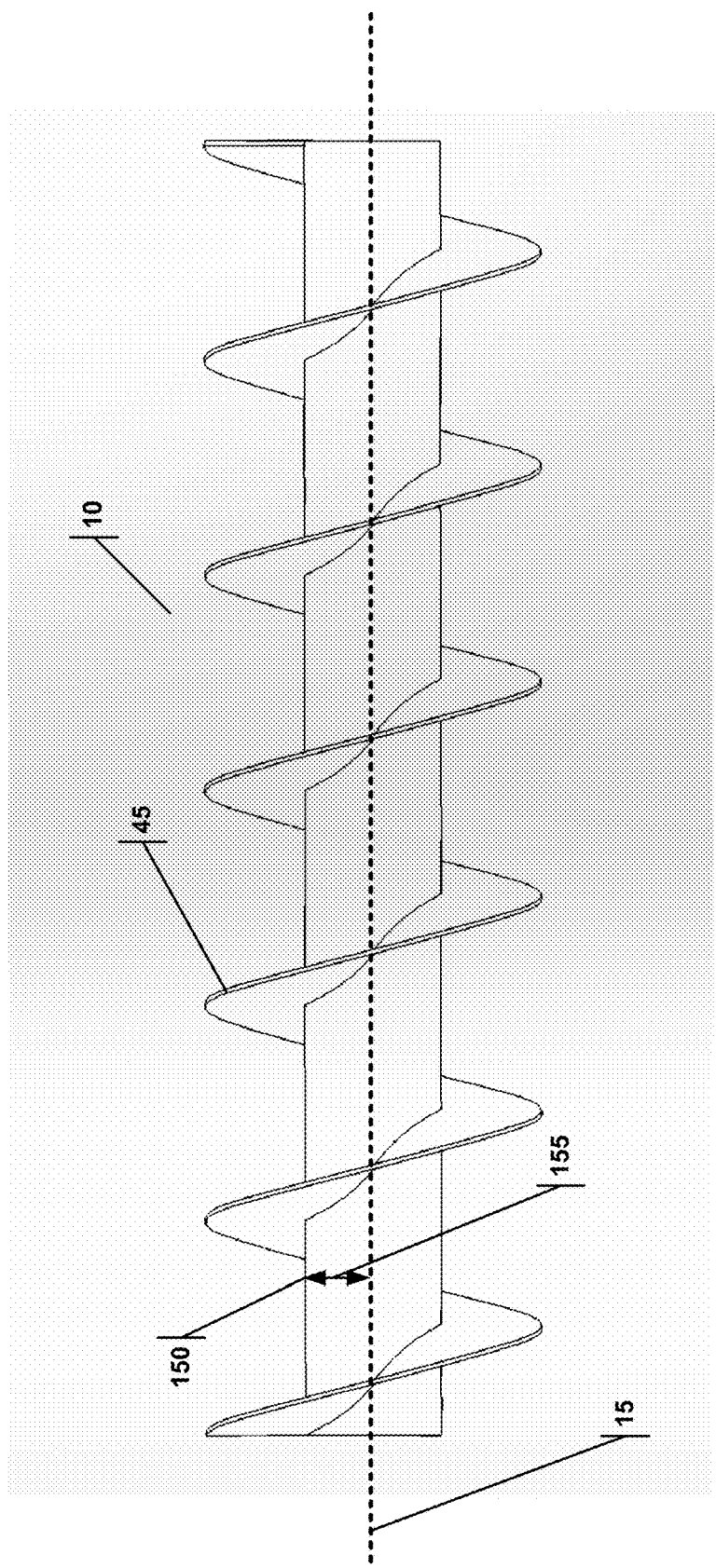
FIG. 3C is a top view of a multi-lobe disc with the larger axis facing up, presented for a more generalized case.
Figure 3D:
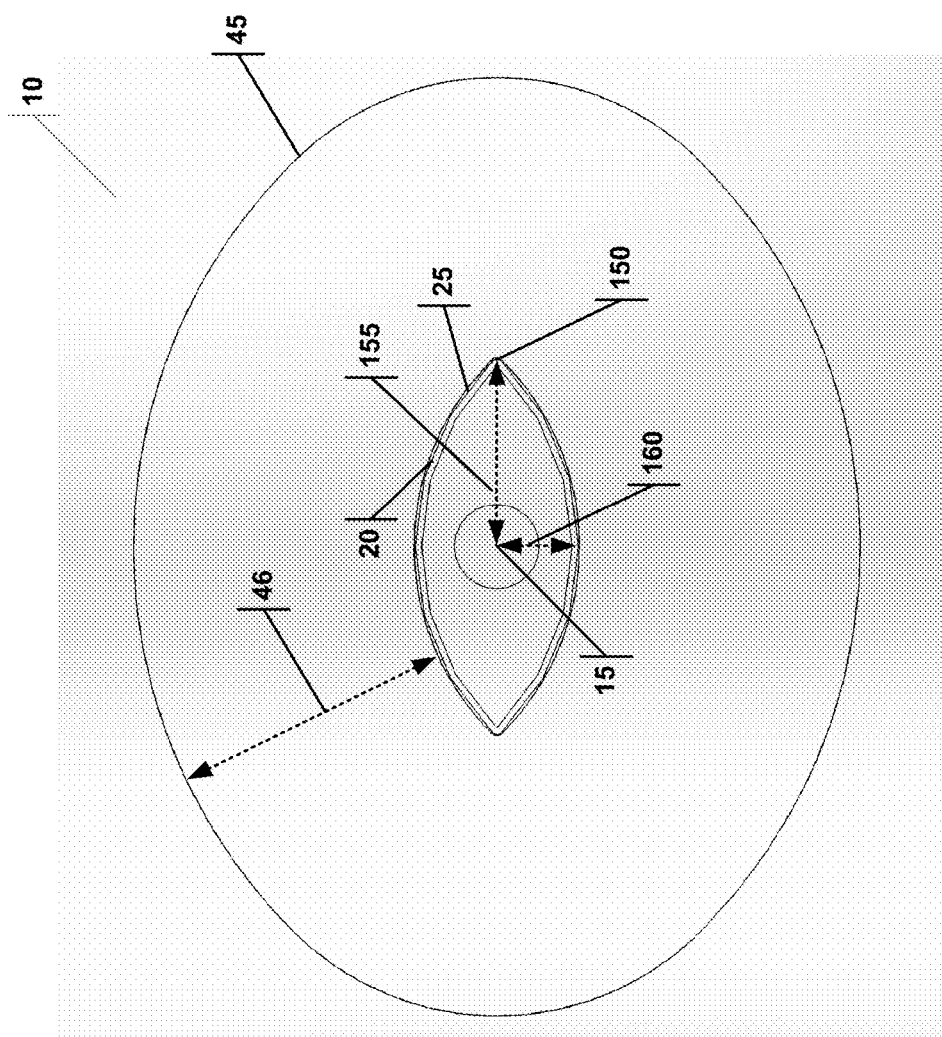
FIG. 3D is a longitudinal view of a multi-lobe disc, presented for a more generalized case.

FIGS. 3A and 3D illustrate that the helical ridge 46 may extend away from the hub surface 25 at a constant height for the length of the helical ridge.

Figure 12:
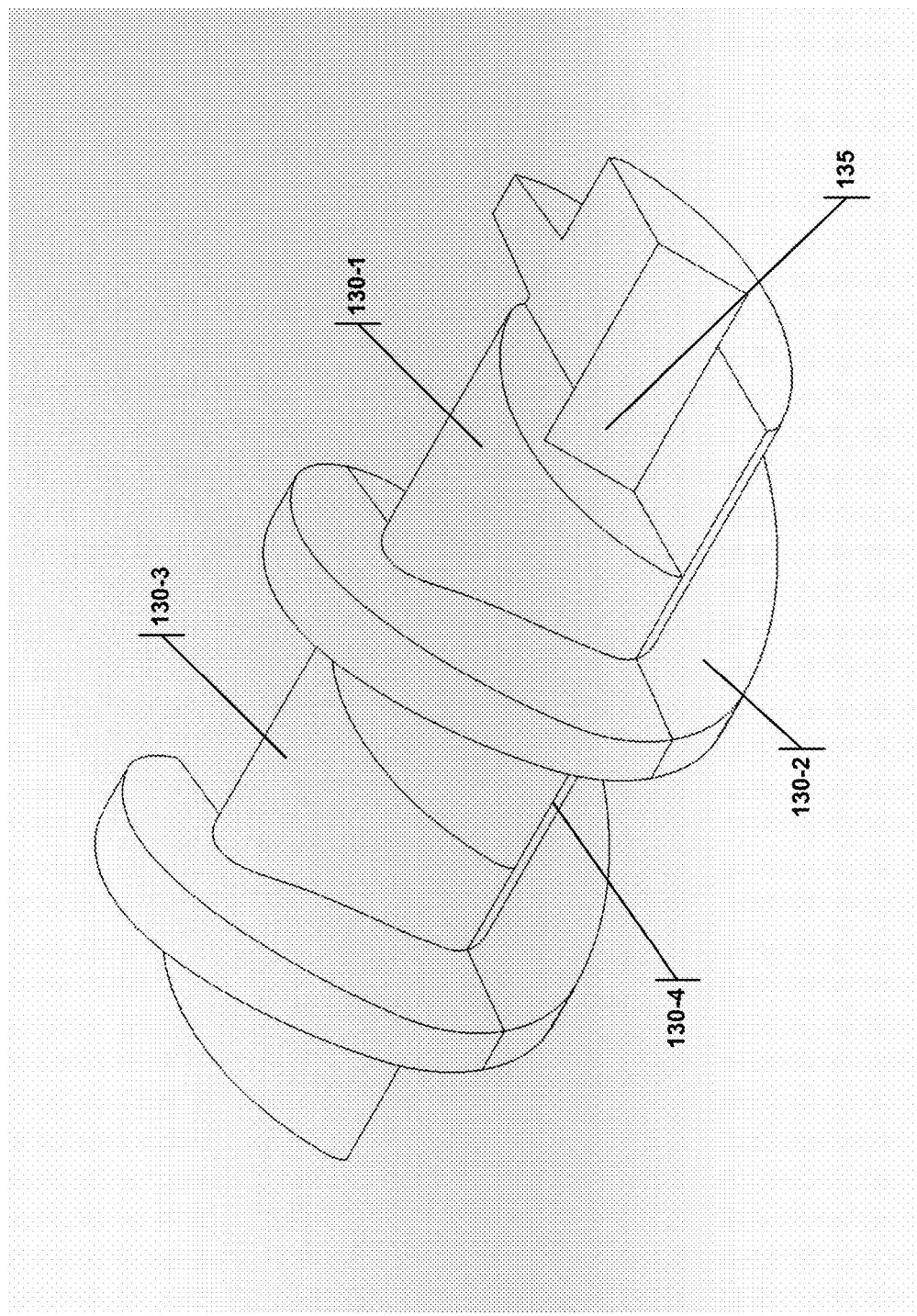
FIG. 12 is an isometric view of four disc halves assembled together with non-aligned staggered splices.
Figure 13A:
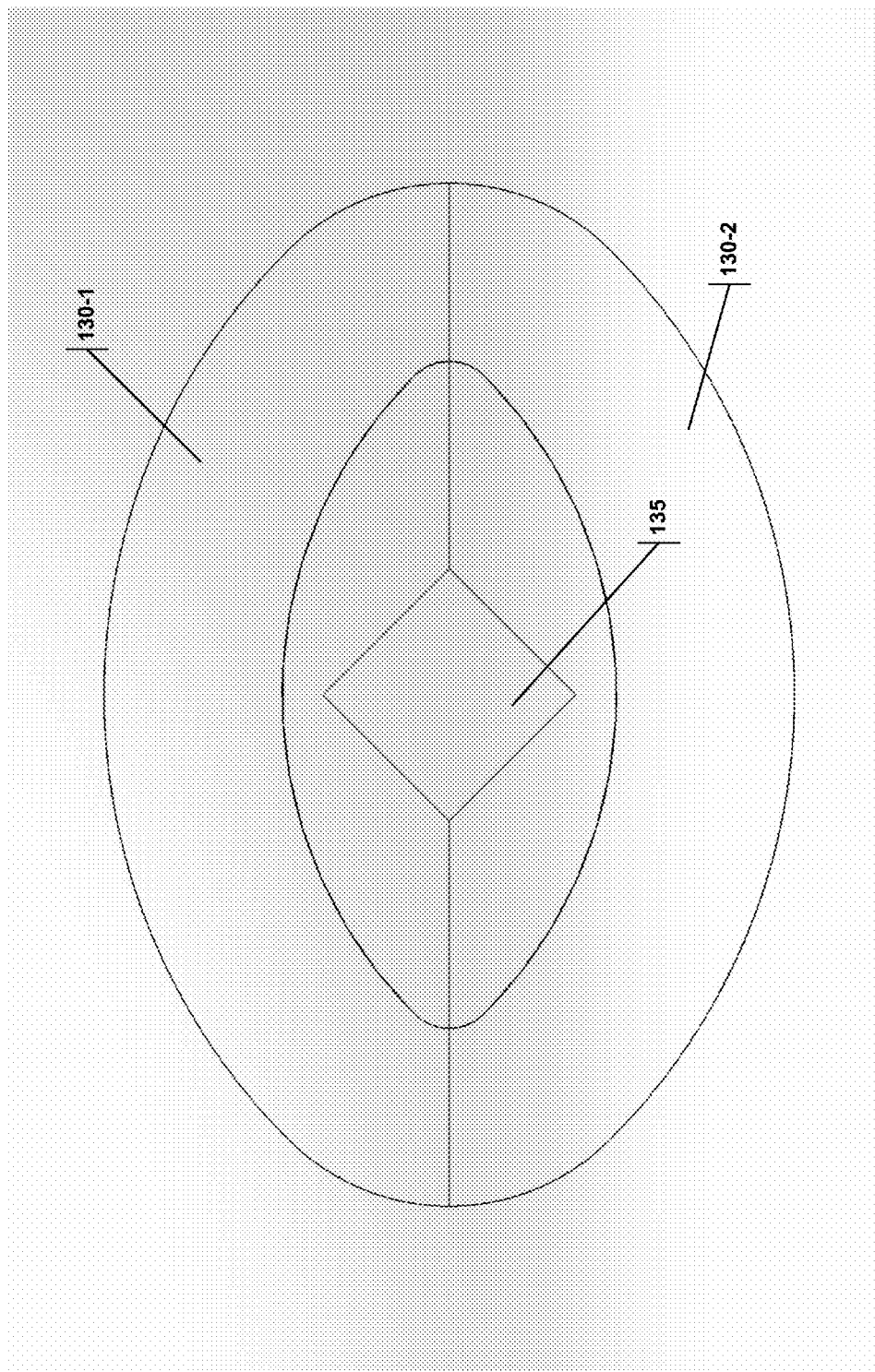
FIG. 13A is an end view of four disc halves assembled together with non-aligned staggered splices.
Figure 13B:
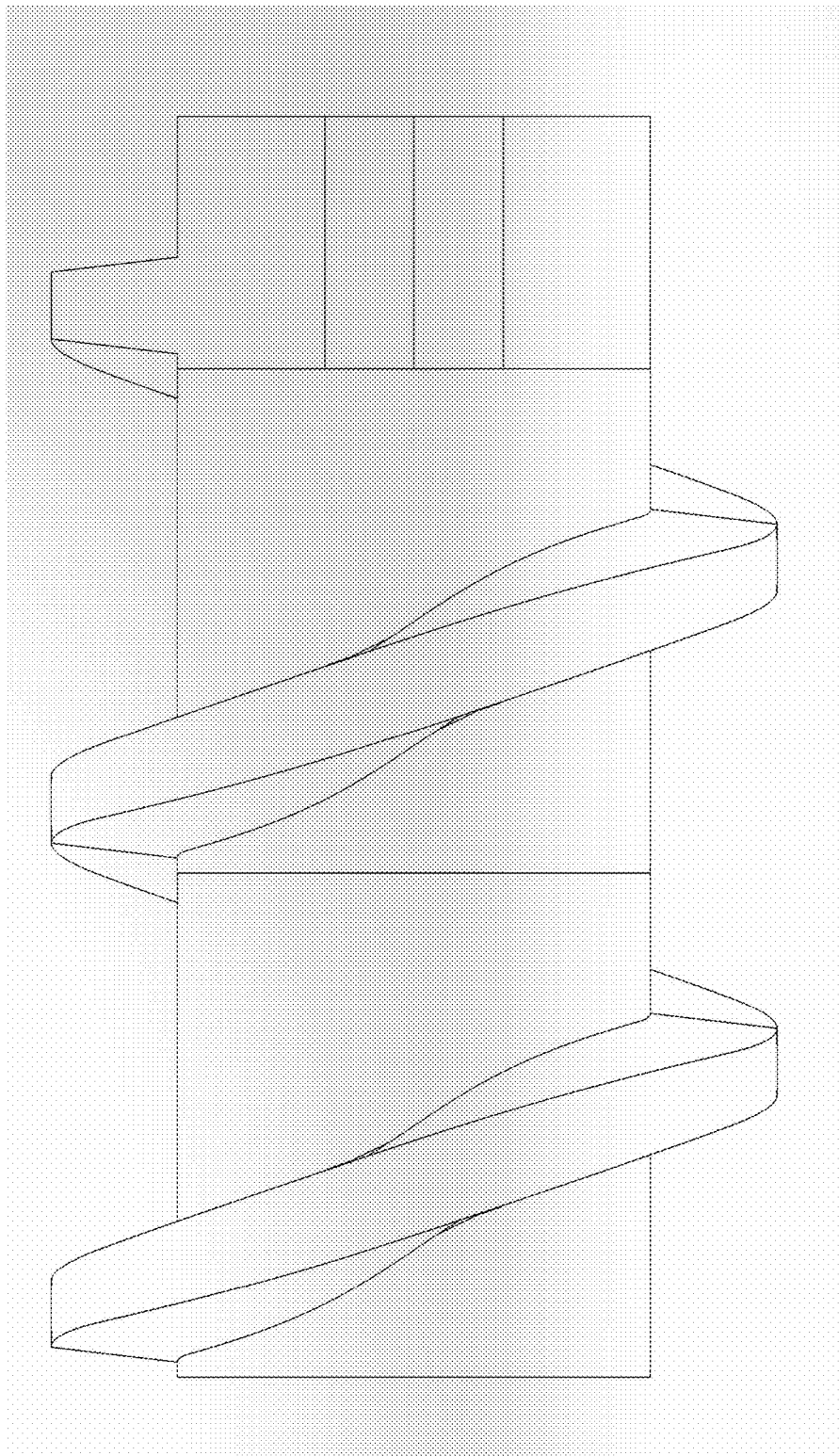
FIG. 13B is a top view of four disc halves assembled together with non-aligned staggered splices.
Figure 13C:
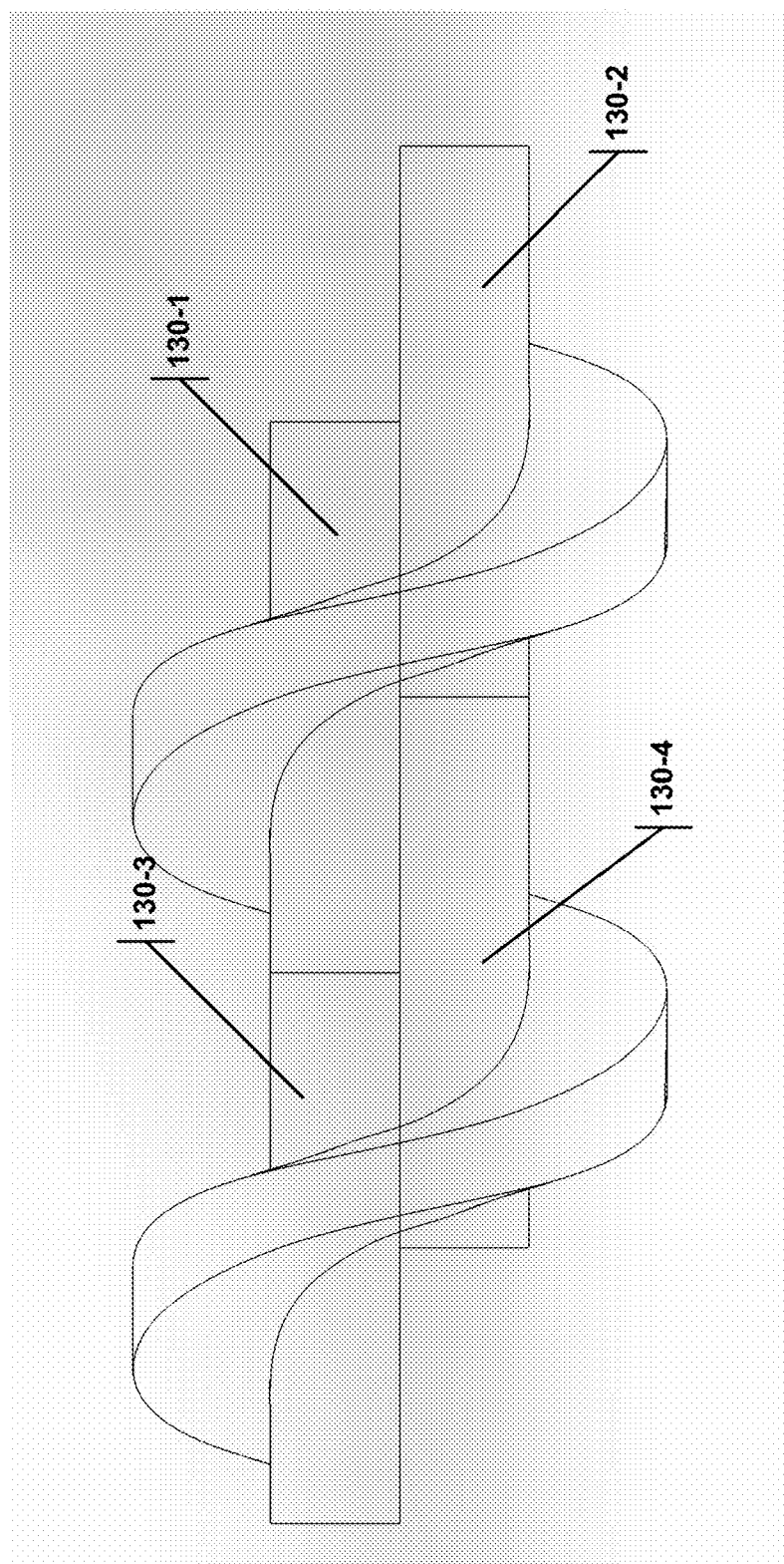
FIG. 13C is a side view of four disc halves assembled together with non-aligned staggered splices.

FIGS. 11A-11D illustrate how the multi-lobe auger-type disc may be constructed from multiple parts. Specifically, disc half 130 is shown, and it has a inner hub keyed surface/hole 135 that may be placed over a powered shaft (not shown). FIGS. 12-13C show how these disc halves 130-1, 130-2, 130-3 and 130-4 may be joined in a staggered configuration to form a multi-lobe auger-type disc. Each of these disc halves may be identical, making the manufacture of them less costly. This split disc design is replaceable on a shaft, without disassembly of the shaft and/or removal of other discs therefrom. The split disc is designed to separate into two portions, with screws or other fasteners holding the halves together. The inner hub keyed surface/hole 135 is designed to fit on the rotatable powered shaft (not shown). The hole 135 comprises planar sections that can make planar contact with the powered shaft (which in the illustrated case would have a square cross section). Because of the design of the split disc, the disc halves 130 are clamped around the power shaft and the planar sections of the hole 135 make contact with the flat sides of the rotatable shafts (in the illustrated case, at four clamping surfaces). This allows the split disc to clamp or grab the power shaft such that it will not freely spin on the shaft.

FIGS. 9A-10B illustrate the helical ridge structure.

Figure 14:
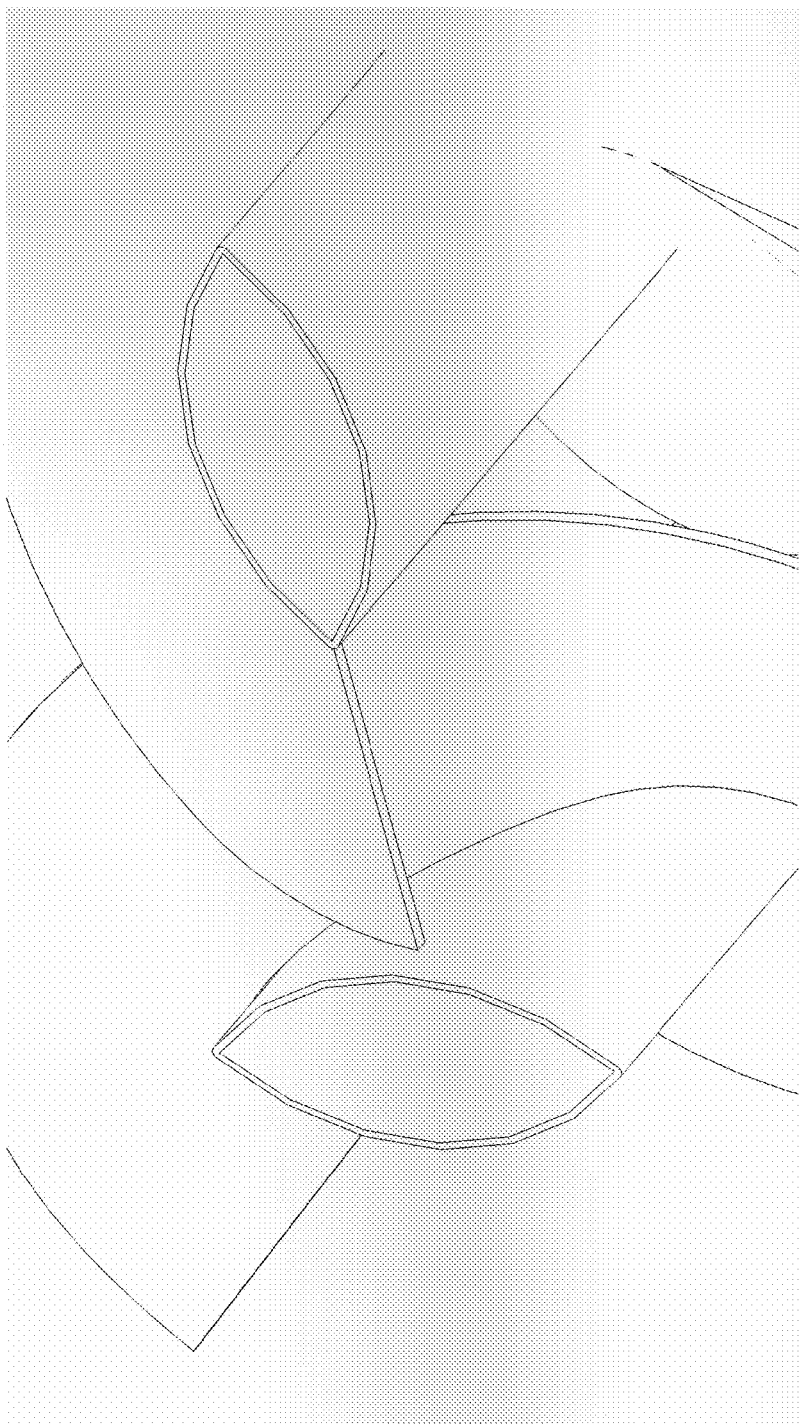
FIG. 14 is a close in view of two adjacent interleaved discs that are 90 degrees out of phase with each other.

Now a multi-lobe auger-type disc screen will be discussed. Referencing FIG. 4A, discs of the construction already described, are placed adjacent to each other where the helical ridge structure 60 from the first disc 50 is interleaved (shown at interleave position 70) with the helical ridge structure 65 of the second disc 55. The discs rotate in direction 85. Where there are an even number of lobes, the first disc 50 is positioned out of phase from the second disc 55 by 90 degrees (as shown by arrow 75); and where the number of lobes N is odd, then the adjacent discs are placed 0 degrees out of phase from each other. FIG. 14 is a close up of two discs interleaved with each other, where one disc is 90 degrees out of phase from the other.

Figure 4A:
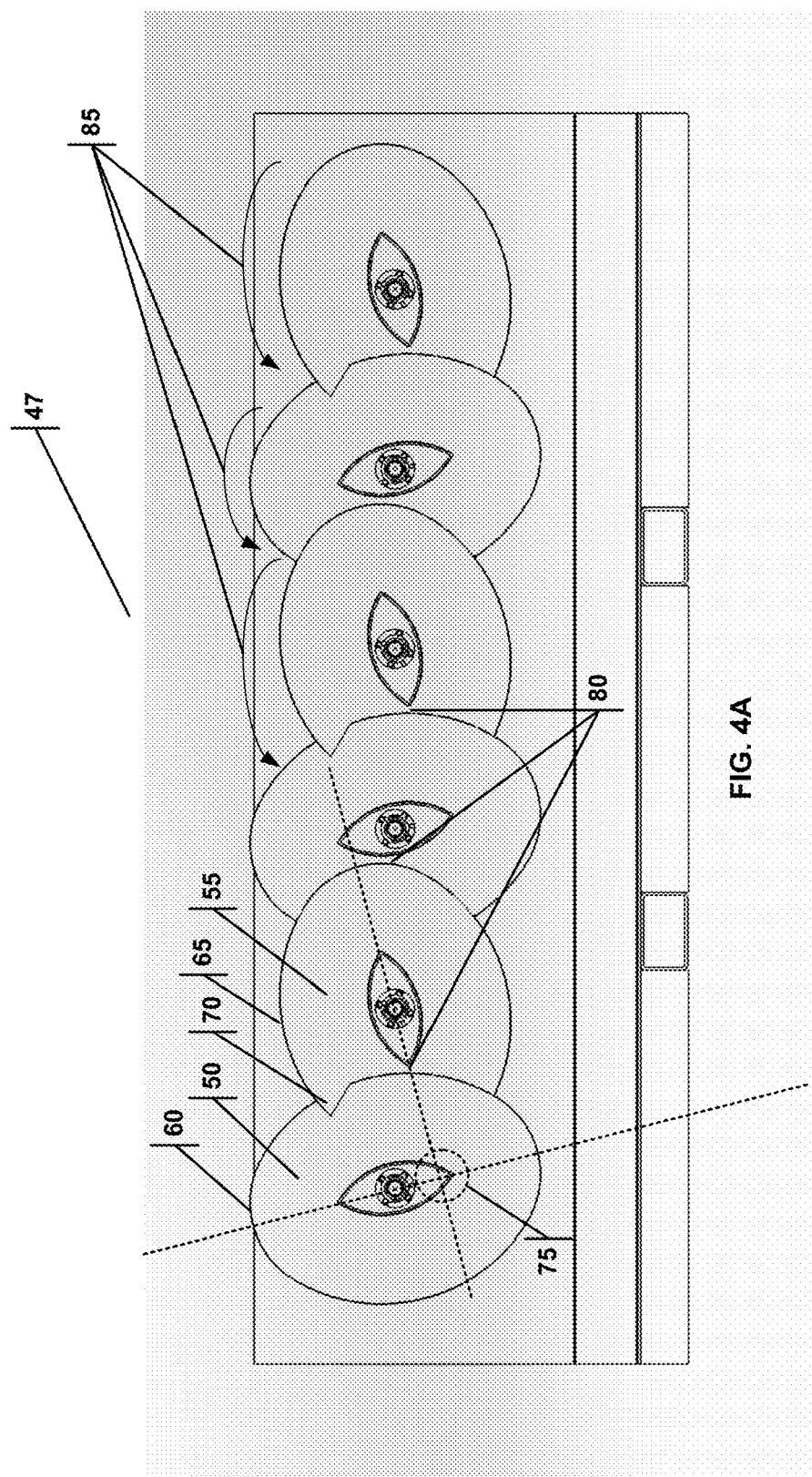
FIG. 4A is an end view of a set of discs interleaved with each other.

The outer edge of the helical ridge of the first disc creates a gap with the hub surface of the adjacent second disc (shown at position 80 in FIG. 4A). When the two discs are rotated in the same direction, the width of the gap remains substantially constant.

Figure 4B:
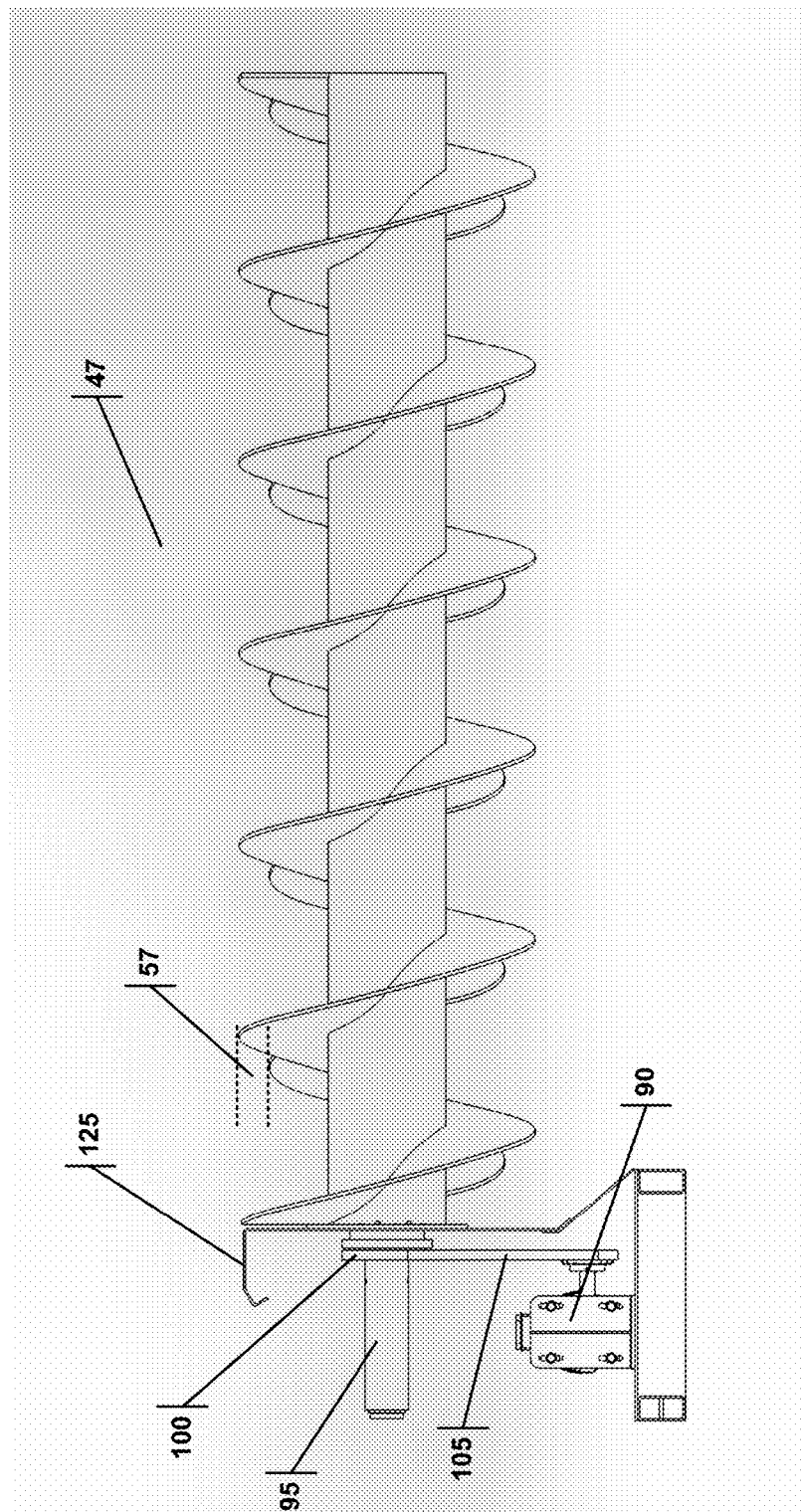
FIG. 4B is an end view of a set of discs interleaved with each other illustrating the amplitude difference.
Figure 4C:
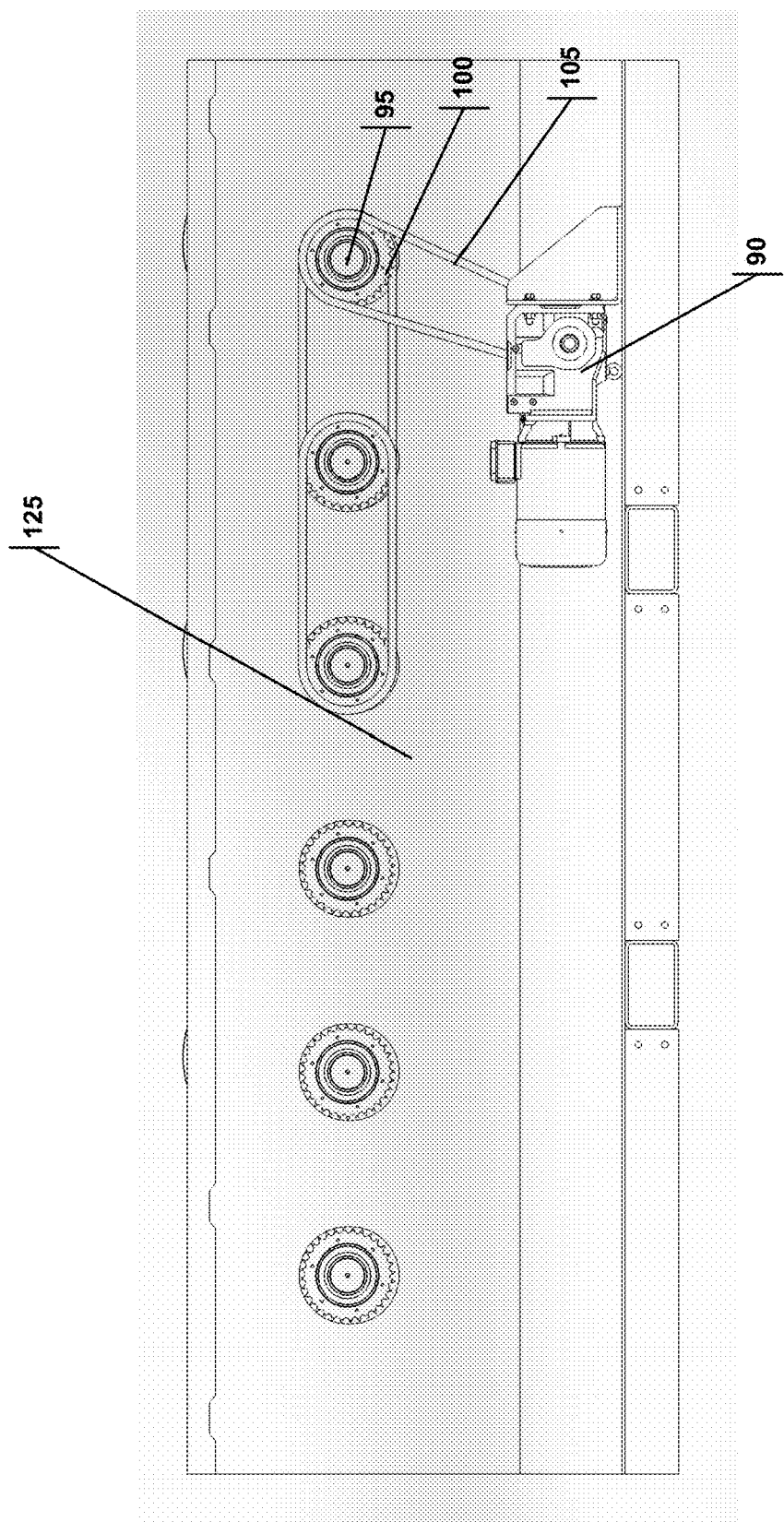
FIG. 4C is a side view of a disc screen with drive components.

FIGS. 4B and 4C show a disc screen 47 with two adjacent multi-lobe auger type screens, each mounted to a power shaft 95 that is powered by a motor 90 via a chain/belt 105 and a gear 100. The various shafts may be held in place by the shaft retention plate 125. This view shows the amplitude difference 57 of the helical ridge 45. The front disc has its major axis in the plane of the paper, while the back disc is 90-degrees out of phase with the minor axis in the plane of the paper. The difference of the height of the helical ridges of adjacent discs is the amplitude difference 57.

Figure 5A:
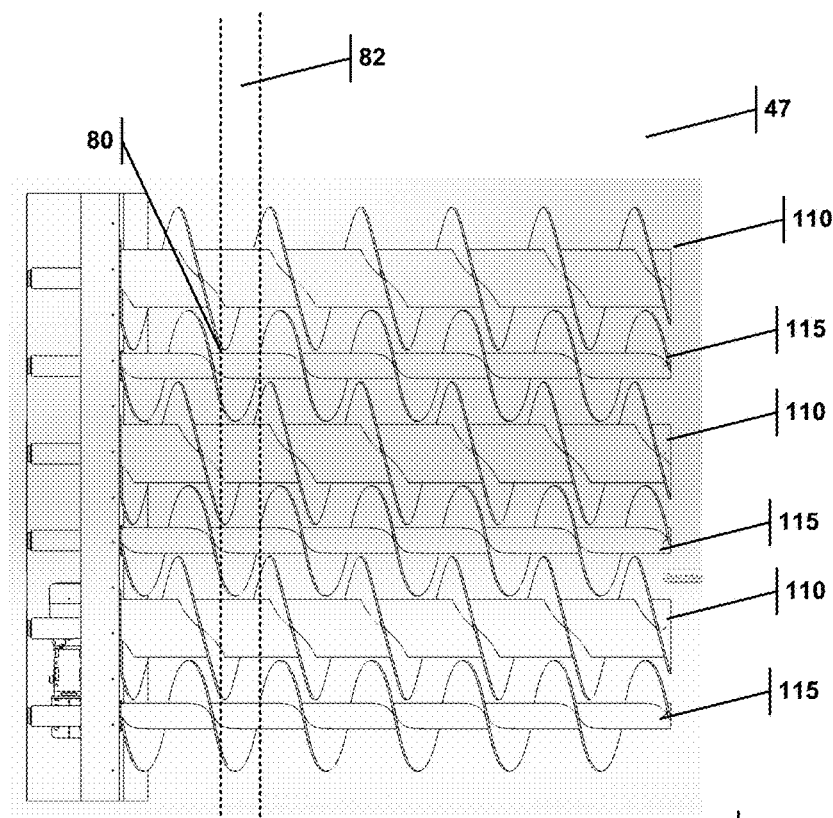
FIG. 5A is a plan view of a disc screen
Figure 5B:
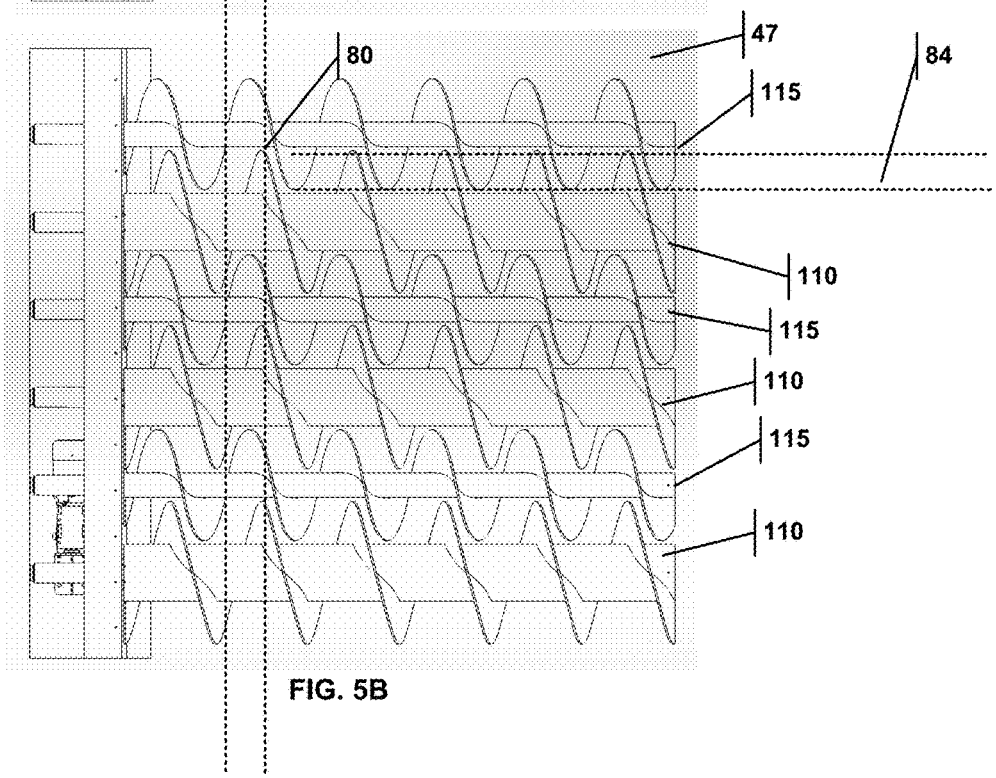
FIG. 5B is a plan view of disc screen where the individual disc have rotated 90 degrees from FIG. 5A.

FIGS. 5A and 5B are intended to show how the gap 80 moves along the direction of the longitudinal axis of the first disc, but the gap relative to the center of the hub of the disc is not substantially constant. In FIG. 5A, the set of discs 110 has its hub with the major axis in the plane of the paper. And the second set of discs 115 has it minor axis in the plane of the paper. Between the discs is a gap 80. In FIG. 5 all the discs have been rotated 90 degrees. The gap 80 has moved along the longitudinal axis (shown by gap longitudinal movement 82). Also, the position of the gap 80 relative to the center of the hub of the disc is not constant, rather it the gap moves laterally (shown by gap lateral movement 84). It is this longitudinal and lateral movement of the gap 80 that promotes more sifting of the material loaded onto the disc screen; thereby promoting more efficient material fallout 120.

Figure 6:
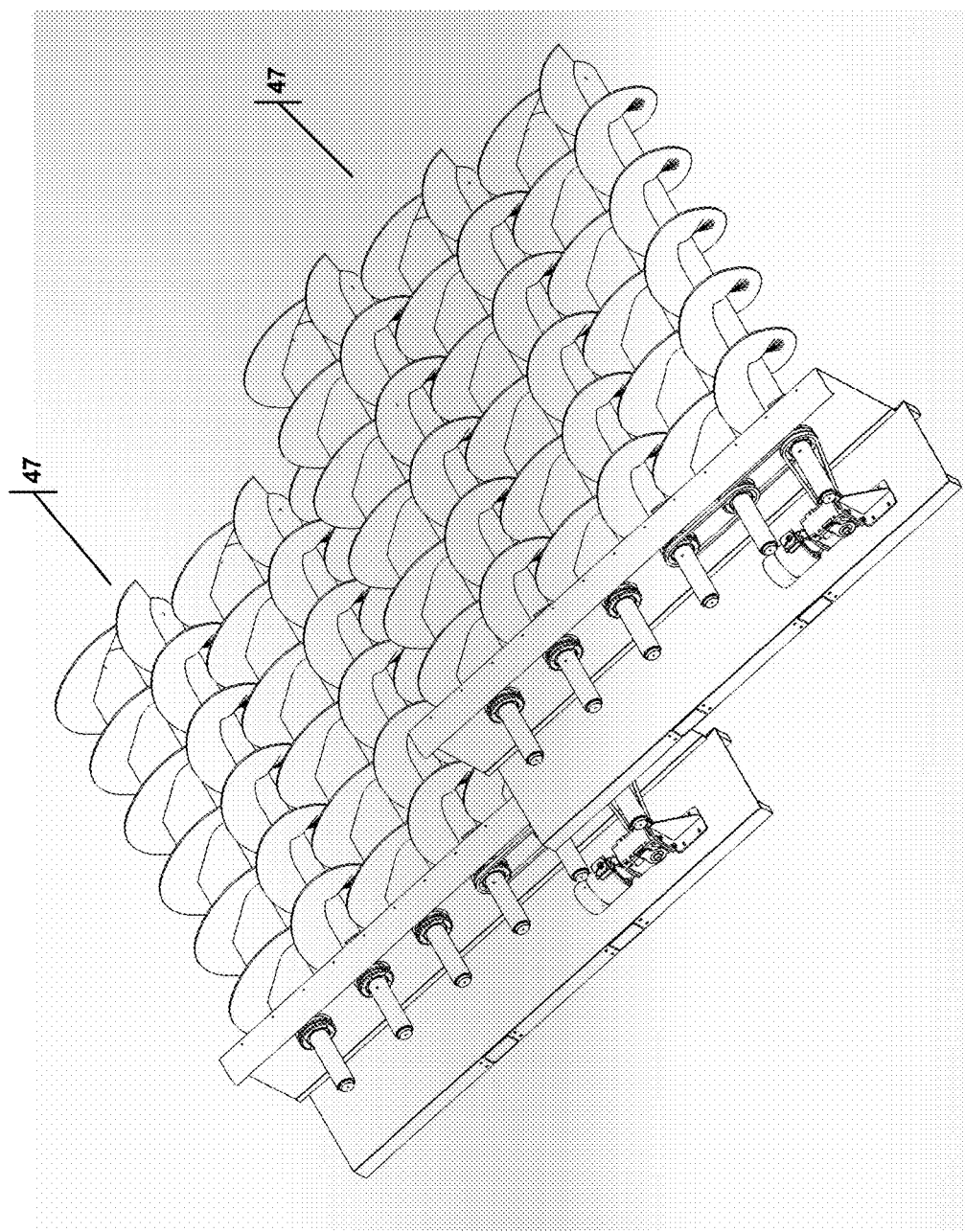
FIG. 6 is an isometric view of an assembled disc screen appropriate for separating cardboard from mixed recyclables.
Figure 7A:
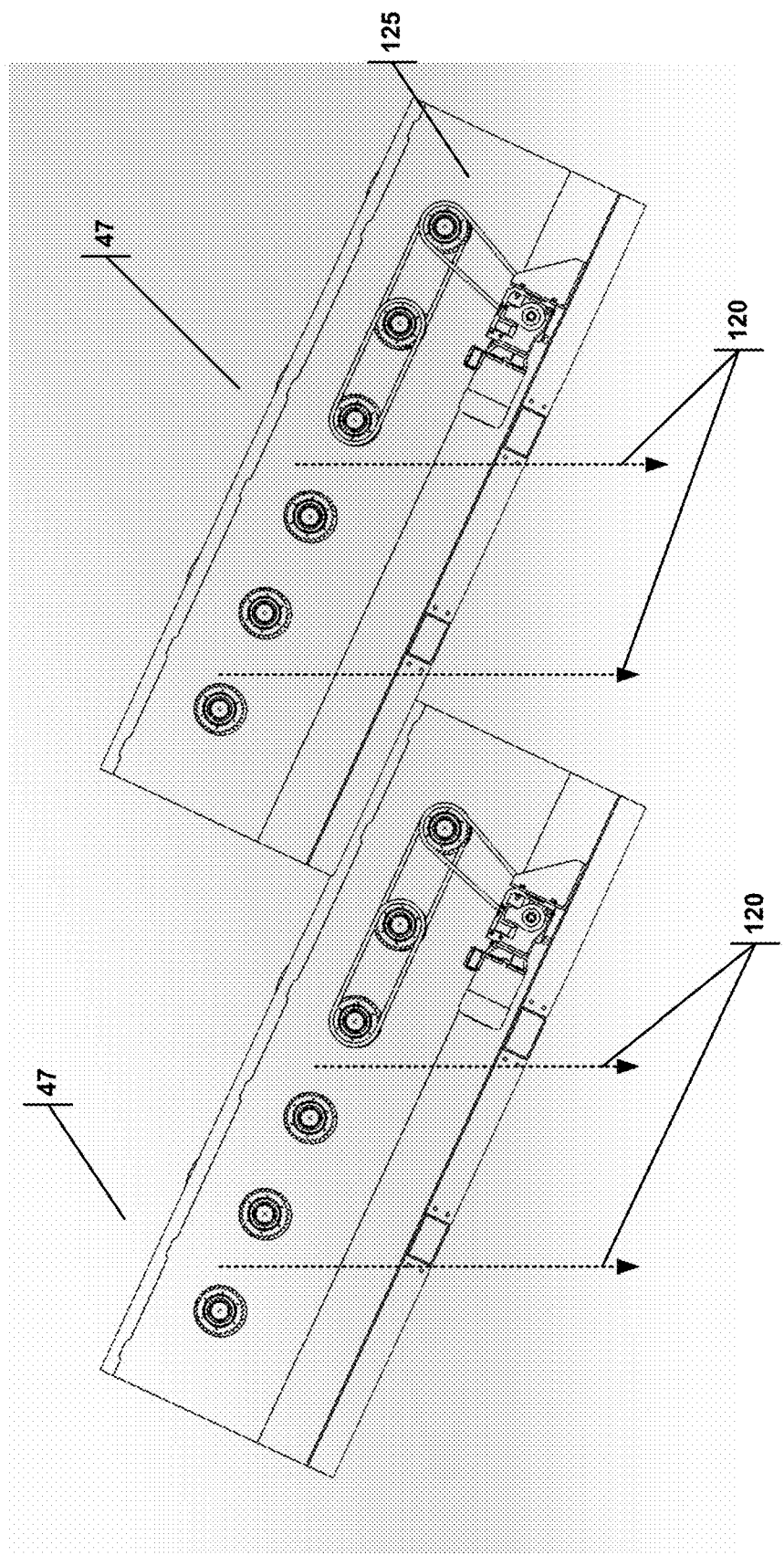
FIG. 7A is a side view of an assembled disc screen appropriate for separating cardboard from mixed recyclables.
Figure 7B:
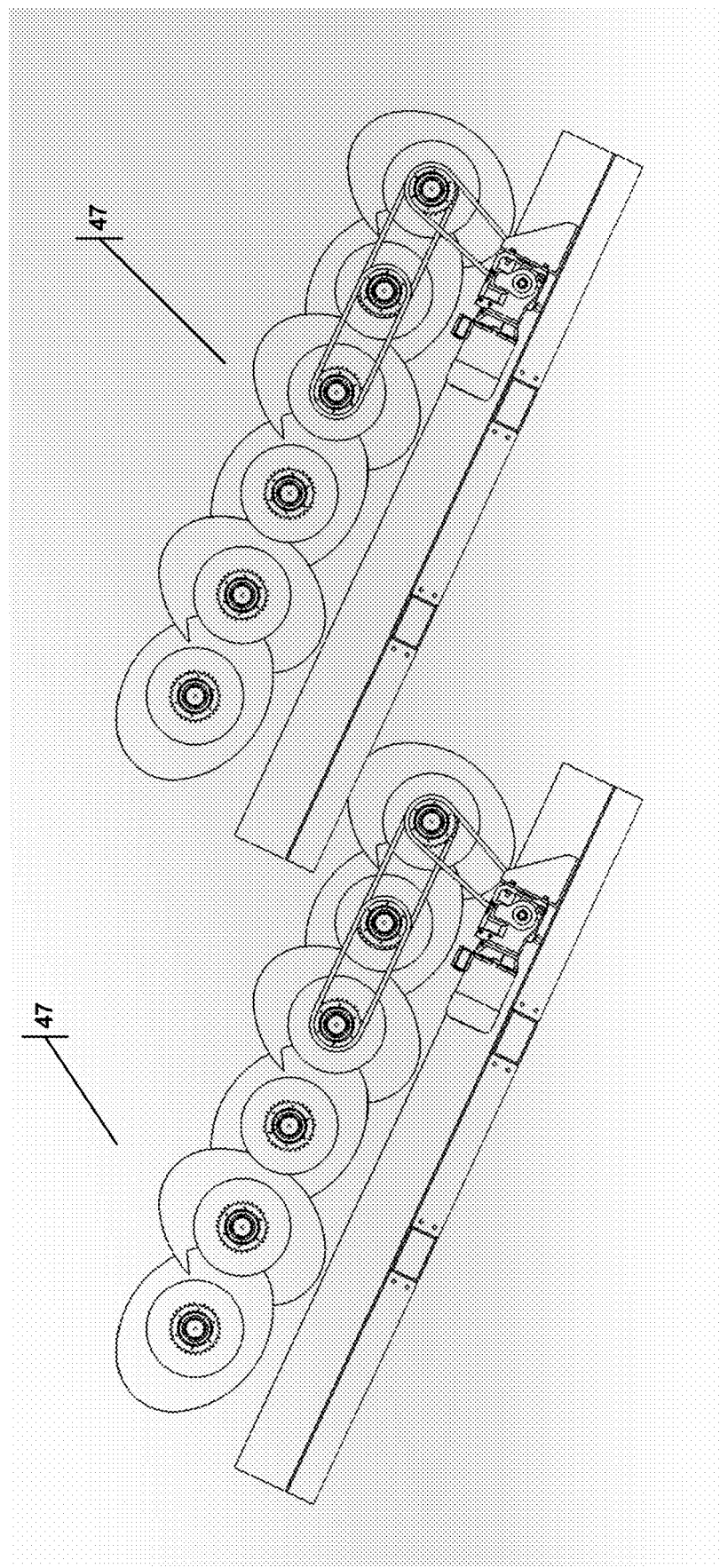
FIG. 7B is a side view of an assembled disc screen appropriate for separating cardboard from mixed recyclables with the axle retention plate removed.
Figure 8:
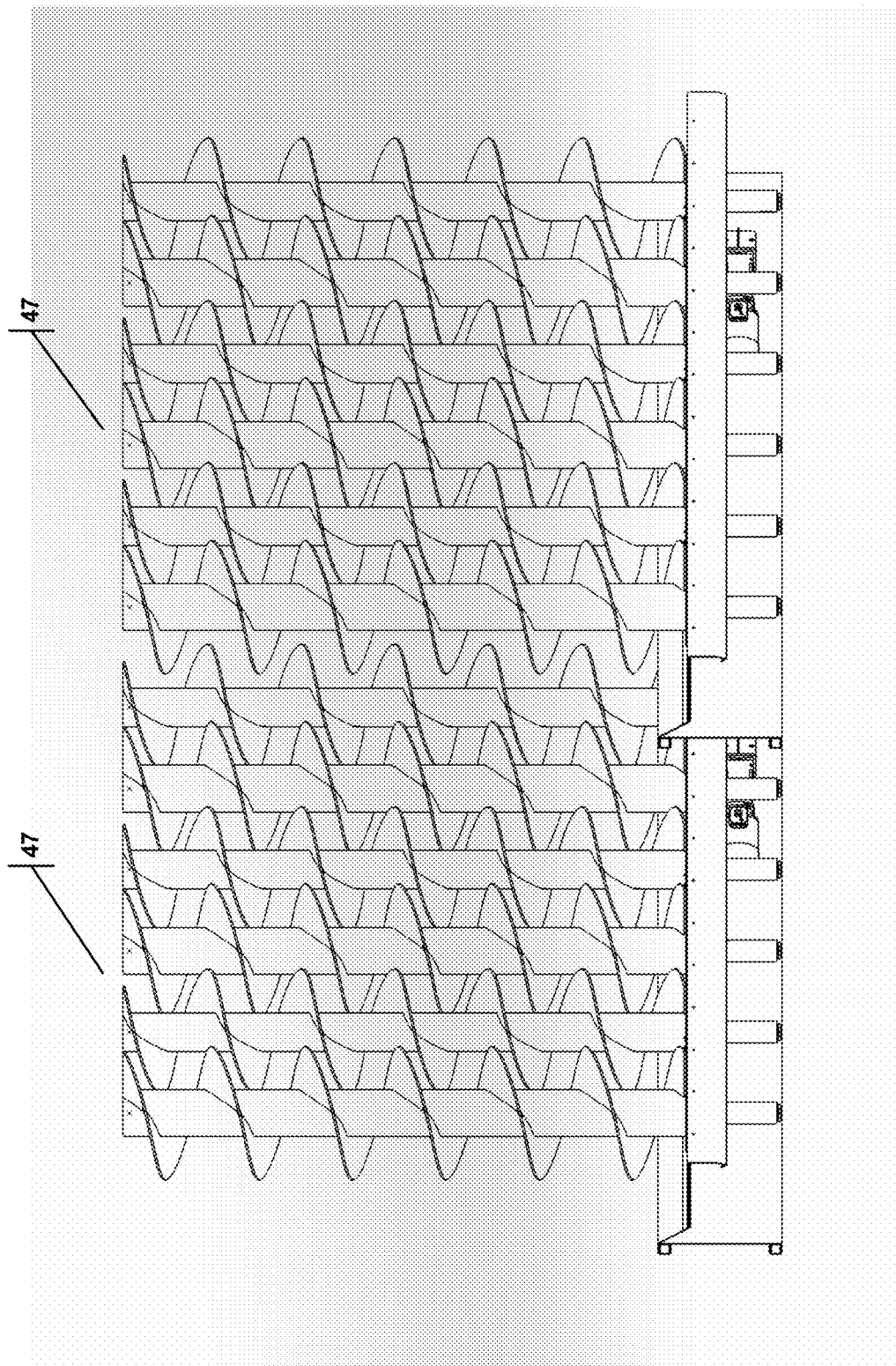
FIG. 8 is a plan view of an assembled disc screen appropriate for separating cardboard from mixed recyclables.

FIGS. 6-8 show two multi-lobe auger-type disc screens, with each screen having an inclination. The first disc screen dumps its overload onto the second disc screen, and each disc allows material to fall between the discs (shown by material fallout 120).

It should be clear that some variance in the minimum distance between the outer edge of the helical ridge and the opposing hub is tolerable, and this invention is not limited to devices with strictly zero variance in the minimum distance. For example, many discs are constructed with bumps or treads on the outer edge in order to increase the surface speed of material on the disc screen.

Figure 15:
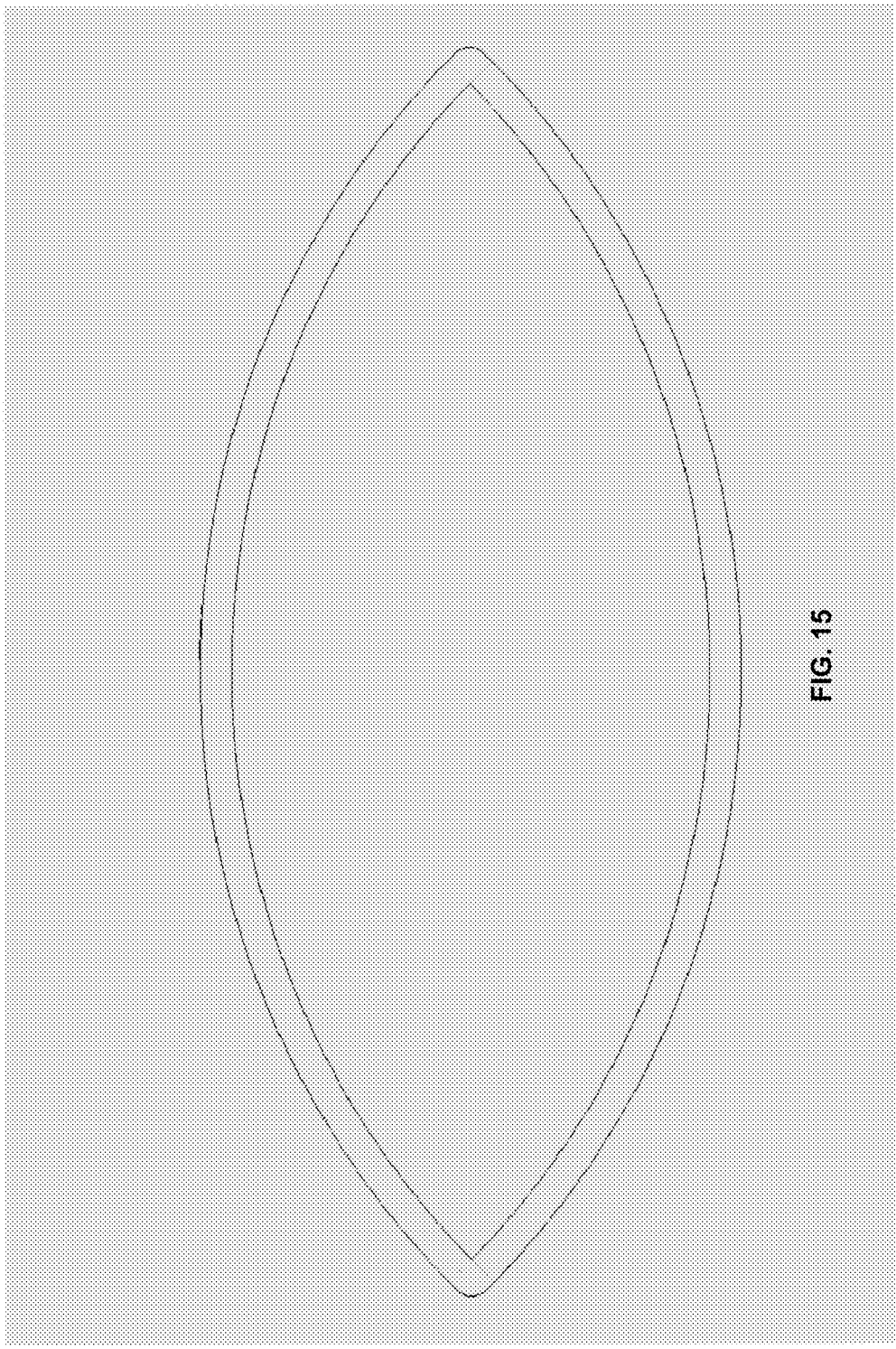
FIG. 15 is a diagram of how to create a non-round tube to match non round discs utilizing two rolled plates seam welded at long end.

The hub can be formed by bump bending or rolling two pieces of plate metal into appropriately shaped arcs and then fill-welding the corner where the two arcs come into contact, as shown in FIG. 15. Forming the hub out of two arcs is preferable as it maximizes the agitation of the machine, however multi-lobe shaped hubs of three, four, or more arcs can be formed with the arcs seam welded together.

Figure 9A:
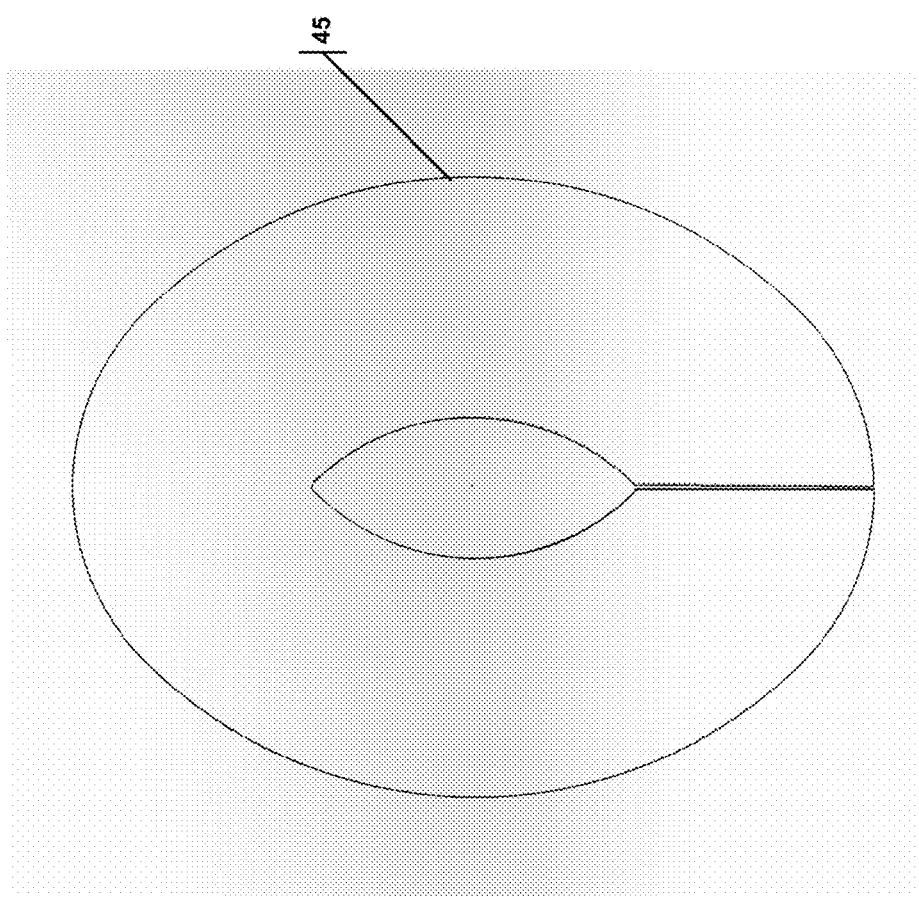
FIG. 9A is a side view of the pattern for the helical ridge.
Figure 10A:
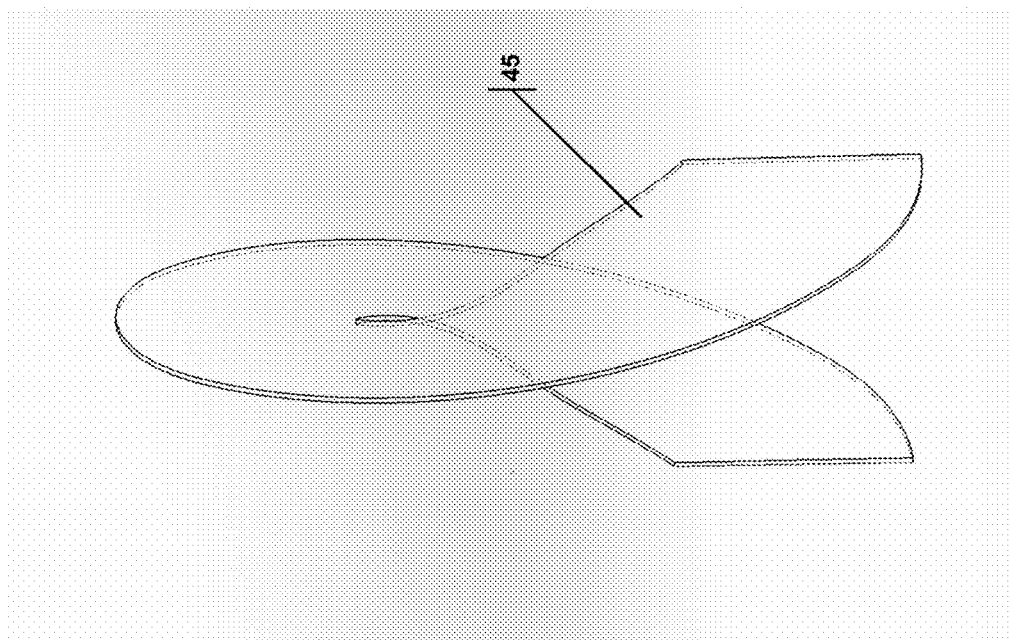
FIG. 10A is an end view of the pattern for the helical ridge
Figure 10B:
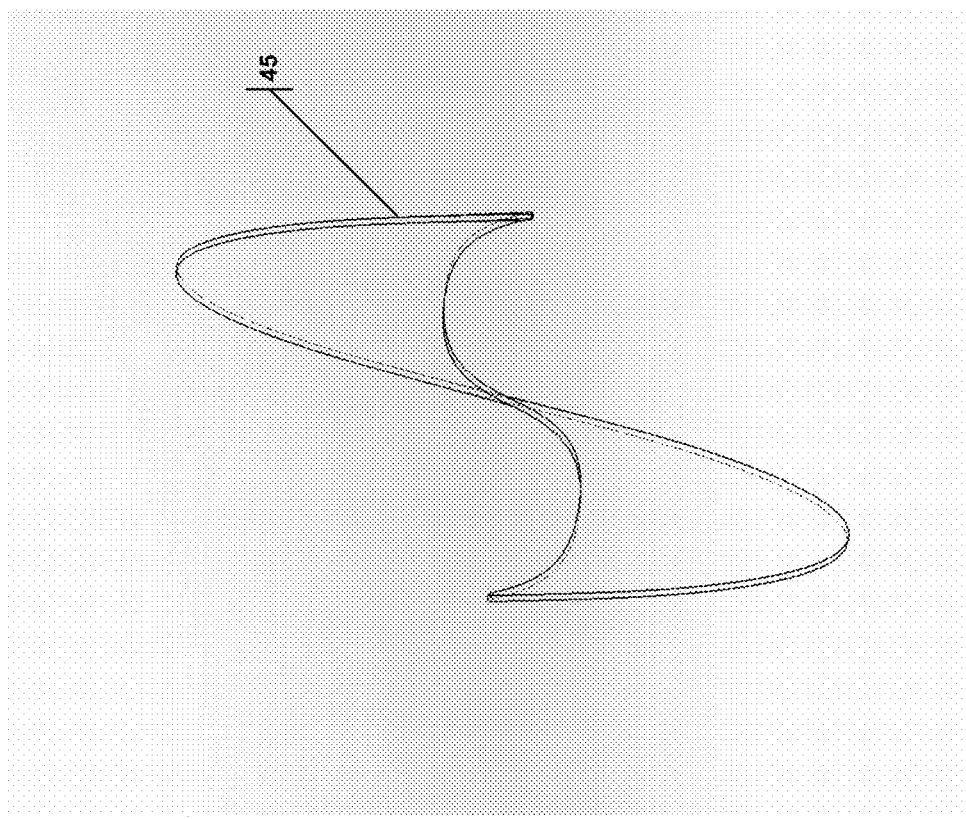
FIG. 10B is bottom view of the pattern for the helical ridge.
Figure 11A:
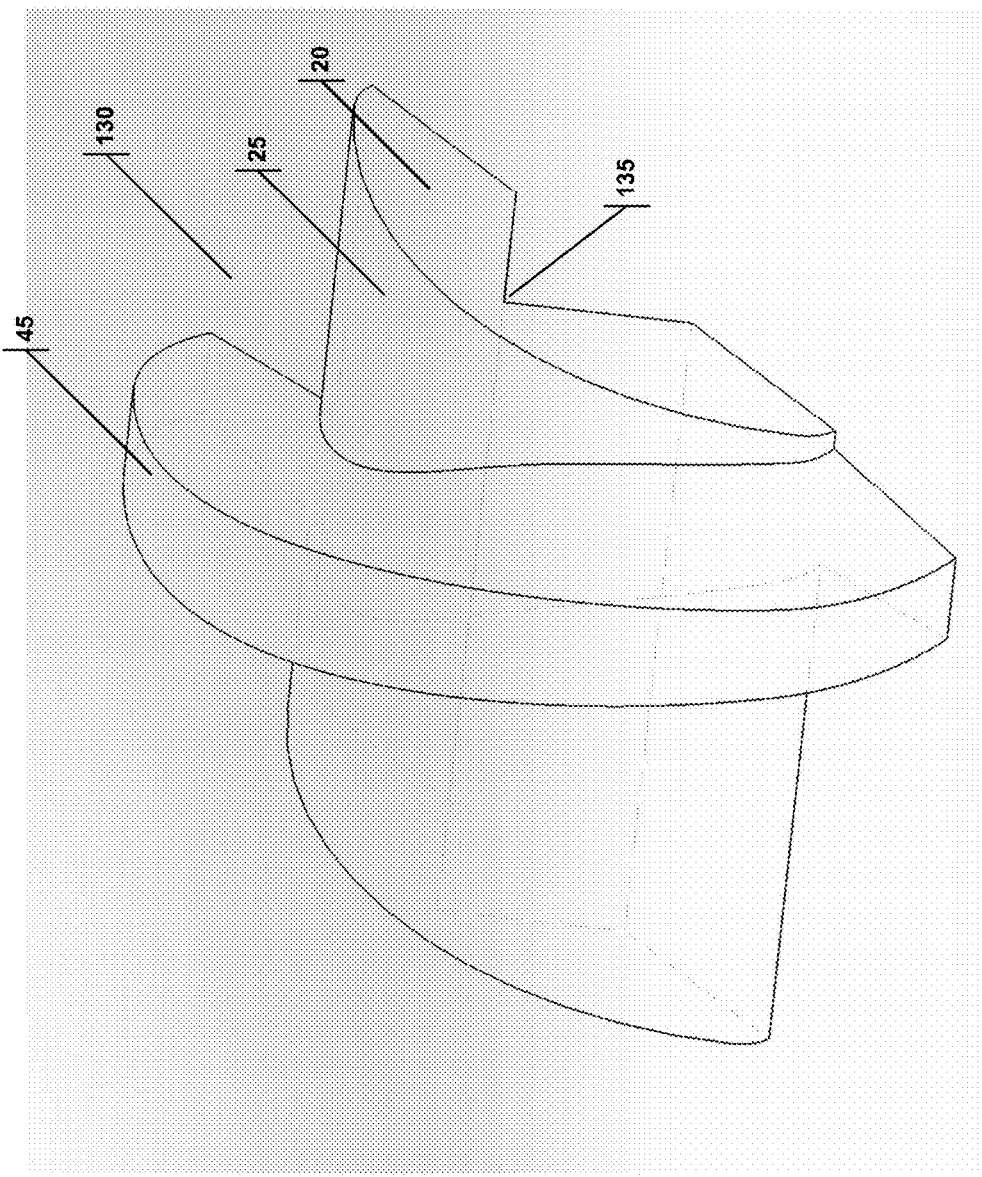
FIG. 11A is an isometric view of a single disc half and substrate cast from an elastomeric material.
Figure 11B:
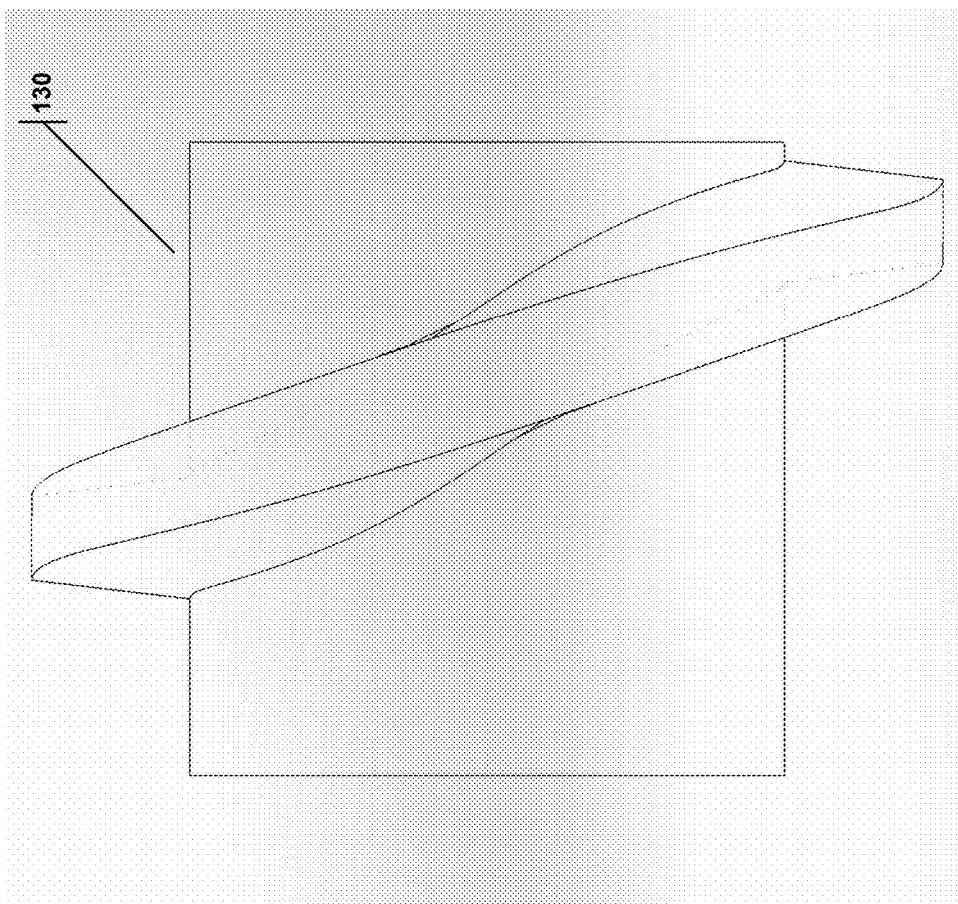
FIG. 11B is a top view of a single disc half and substrate cast from an elastomeric material.
Figure 11C:
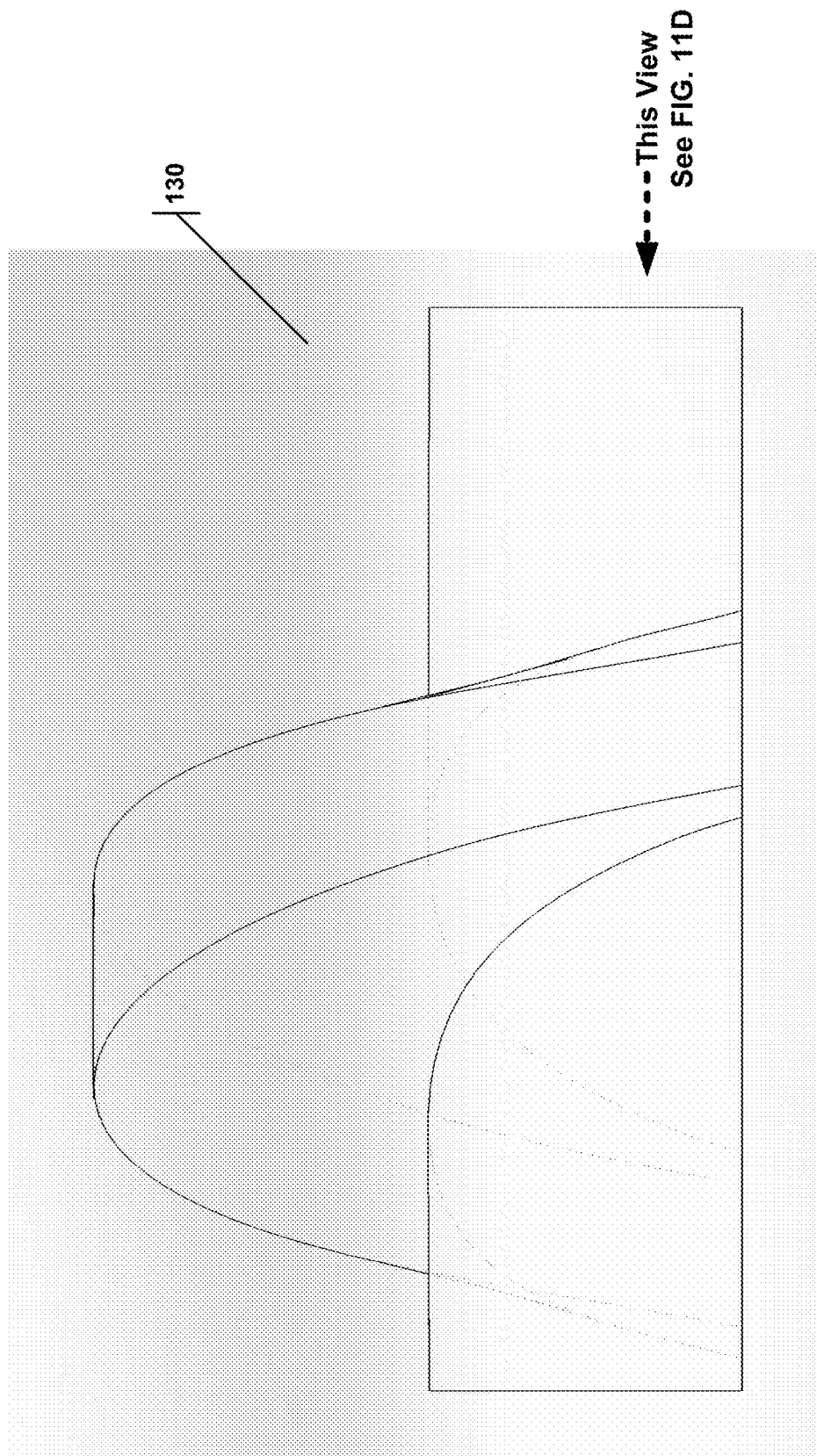
FIG. 11C is a side view of a single disc half and substrate cast from an elastomeric material.
Figure 11D:
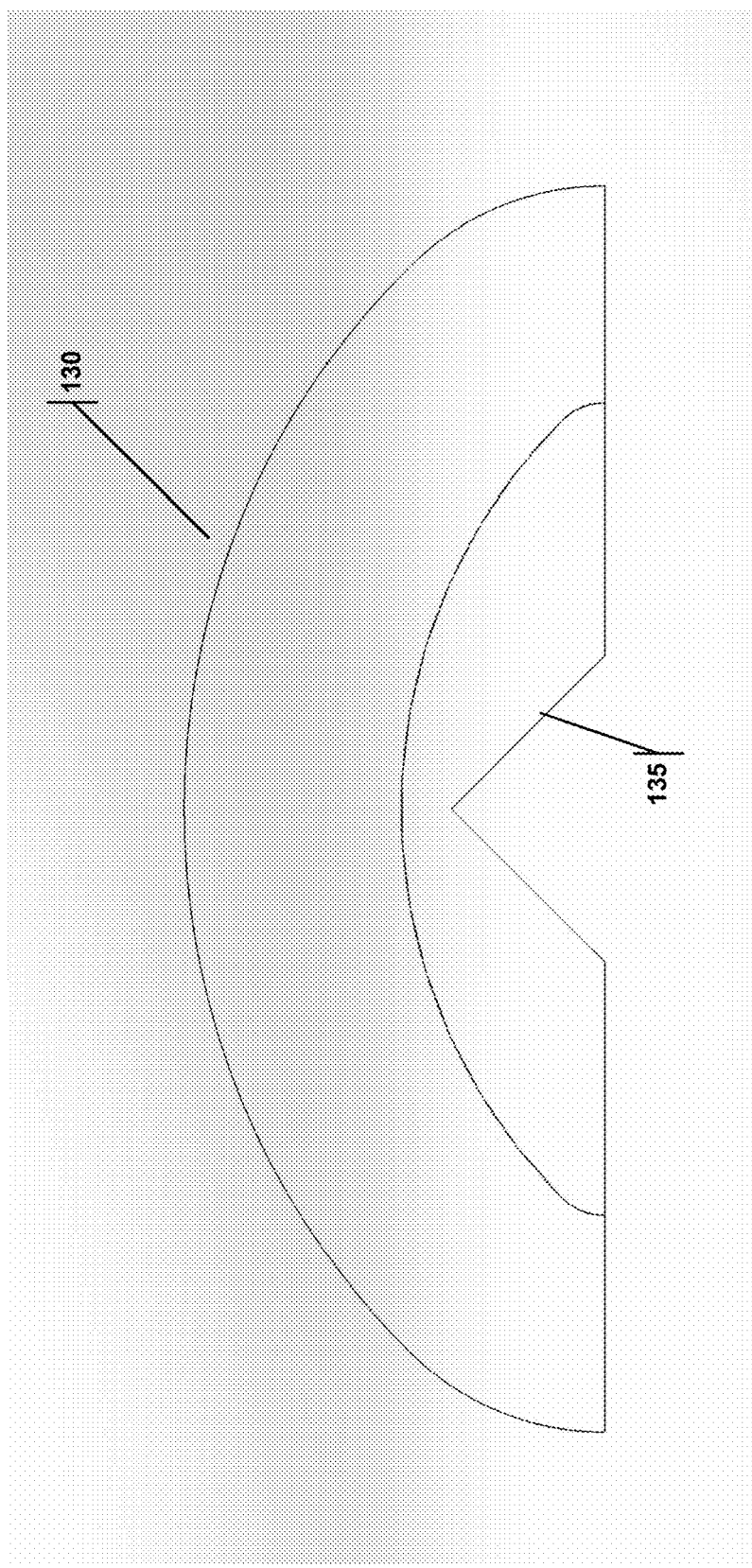
FIG. 11D is an end view of a single disc half and substrate cast from an elastomeric material.

The helical ridge can be formed by first cutting the flat pattern of the disc out of sheet metal or other appropriate material (FIG. 9A). The helical ridge can then be shaped in the longitudinal direction utilizing cold forming techniques, such as bump forming, roll forming, or deep drawing (FIGS. 9B-10B). It is preferable to stack each helical ridge onto the appropriate hub and weld it in place. This may be performed in sections where the trailing edge of on section is welded to the leading edge of the next section. This prevents any hard edges from being present within the disc screen as hard edges can grab and wrap materials. It is also possible to form the described shapes out of molded elastomeric materials, such as rubber or plastic.

Figure 17A:
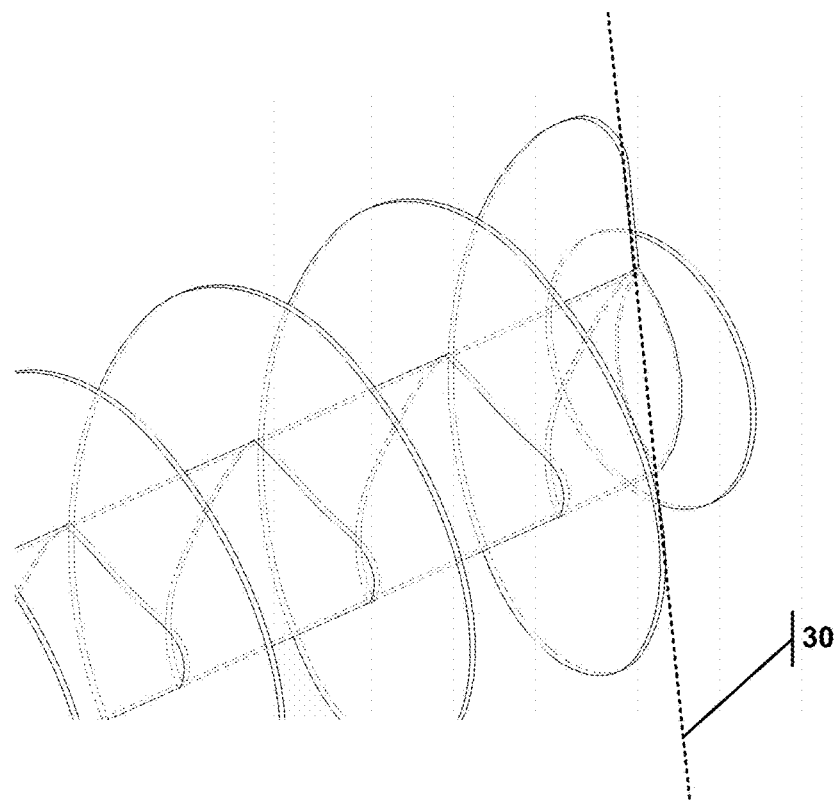
FIG. 17A illustrates a disc where the helical ridge starts at a first angle.
Figure 17B:
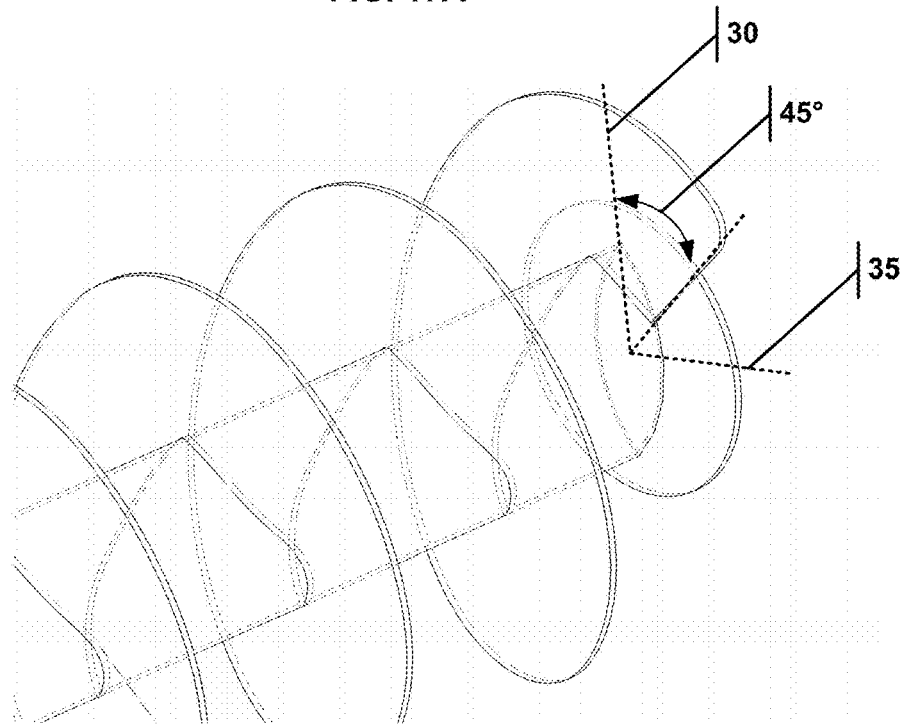
FIG. 17B illustrates a disc where the helical ridge starts at a second angle.

When the preferred embodiment of a two-lobed disc is used, it is sometimes necessary to use different discs in adjacent positions. Referring to FIG. 17A, the disc has the helical ridge that begins at the major axis 30. In an adjacent disc shown in FIG. 17B, the helical ridge begins at a position between the major axis 30 and minor axis 35 (shown as 45 degrees from the major axis 30, which is the angle formed by the intersection of the major axis with a line taken from hub surface at the helical ridge starting position to the center of the hub). Using this same measurement convention, in FIG. 17A the starting position of the helical ridge is 0 degrees, so the first angle from the disc in FIG. 17A is not equal with the second angle from the disc in FIG. 17B. When the discs from FIGS. 17A and 17B are adjacent to each other they are positioned out of phase from each other by 90 degrees. The position of the helical ridge can be adjusted from 0 to 179 degrees depending on the fit of adjacent discs and the desired opening. It is not necessary to alternate starting points on each sequential disc once a fitting set is found. It may be beneficial to use three or more starting positions in sequence. For example, first disc is 0 degrees, second is 45 degrees, third is 90 degrees, 4th is 135 degrees, 5th is 180 degrees, thus the pattern repeats. The difference in the start positions of the helical ridges allows the adjacent discs to interleave more tightly with each other. This variable helical ridge starting position is not limited to the two lobe disc design, but may be applied more generally to the multi-hub disc.

Traditional auger screens have an issue in that material tends to be poorly distributed across the disc screen deck. Because the disc screen has conveyance in two directions, in the forward direction caused by the rotation of the outer edges of the helical ridge and in the side direction caused by pushing from the helical ridge conveyors, a triangular pattern of material tends to form on the deck, with half the screening deck uncovered and unutilized. However, a non-round hub, as disclosed herein, creates a bumping and lifting action underneath material trapped in this pocket. This bouncing motion, when combined with inclination (shown in FIGS. 6-8) can induce material to bounce out of its current pocket to a pocket further inside the disc screen. This helps mitigate the side conveyance effect and reduces the triangular nature of the spread, increasing screen deck utilization and keeping material more centered on the disc screen, which has a further benefit of rendering the gathering of material easier.

The invention has been described in connection with specific embodiments that illustrate examples of the invention but do not limit its scope. Various example systems have been shown and described having various aspects and elements. Unless indicated otherwise, any feature, aspect or element of any of these systems may be removed from, added to, combined with or modified by any other feature, aspect or element of any of the systems. As will be apparent to persons skilled in the art, modifications and adaptations to the above-described systems and methods can be made without departing from the spirit and scope of the invention, which is defined only by the following claims. Moreover, the applicant expressly does not intend that the following claims "and the embodiments in the specification to be strictly coextensive." *Phillips v. AHW Corp.*, 415 F.3d 1303, 1323 (Fed. Cir. 2005) (en banc).

The invention claimed is:

1. A disc for use in a disc screen, the disc having a longitudinal axis, the disc comprising:
    a hub extending a length along the longitudinal axis, wherein the longitudinal axis is coaxial with the center of the hub, the hub further comprising:
        a hub surface;
        a major axis defined by a first cross-section taken perpendicularly to the longitudinal axis and through the center of the hub at a first position along the hub surface;
        a minor axis defined by a second cross-section taken perpendicularly to the longitudinal axis and through the center of the hub at a second position along the hub surface;
    wherein the first cross-section is longer than the second cross-section, and the first cross-section is substantially orthogonal to the second cross-section; and
    a helical ridge structure extending away from the hub surface and twisting about the longitudinal axis for the length, and wherein the helical ridge structure twists at least 360 degrees about the longitudinal axis.

2. The disc of claim 1, wherein the helical ridge extends away from the hub surface at a height, and the height is constant for the length of the helical ridge.

3. The disc of claim 1, wherein the disc is split and comprised of multiple parts.

4. The disc of claim 3, wherein the multiple parts are identical and joined in a staggered configuration.

5. A disc screen comprising;
    a first and second adjacent discs, each disc comprising:
        a longitudinal axis;
        a hub extending a length along the longitudinal axis, wherein the longitudinal axis is coaxial with the center of the hub, the hub further comprising:
            a hub surface;

a major axis defined by a first cross-section taken perpendicularly to the longitudinal axis and through the center of the hub at a first position along the hub surface;

a minor axis defined by a second cross-section taken perpendicularly to the longitudinal axis and through the center of the hub at a second position along the hub surface;

wherein the first cross-section is longer than the second cross-section, and the first cross-section is substantially orthogonal to the second cross-section; and a helical ridge structure extending away from the hub surface and twisting about the longitudinal axis for the length and wherein the helical ridge structure twists at least 360 degrees about the longitudinal axis;

wherein the helical ridge structure from the first disc is interleaved with the helical ridge structure of the second disc, and the first disc is positioned out of phase from the second disc by 90 degrees.

6. The disc screen of claim 5, wherein an outer surface of the helical disc of the first disc forms a gap width with the hub surface of the second disc, and when the two discs are rotated in the same direction, the width of the gap is substantially constant.

7. The disc screen of claim 6, wherein the position of the gap moves along the direction of the longitudinal axis of the first disc.

8. The disc screen of claim 5, wherein the position of the gap relative to the center of the hub of the first disc is not substantially constant.

9. The disc screen of claim 5, wherein the helical ridge for each disc extends away from the hub surface at a height, and the height is constant for the length of the helical ridge.

10. The disc screen of claim 5, wherein the first and second discs are each split and are each comprised of multiple parts.

11. The disc screen of claim 10, wherein the multiple parts are identical and joined in a staggered configuration.

12. The disc screen of claim 5, wherein:

the starting position of the helical ridge of the first disc is at a first angle, where the first angle is the angle formed by the intersection of the first disc major axis with a line taken from first disc hub surface at the first disc helical ridge starting position to the center of the first disc hub;

the starting position of the helical ridge of the second disc is at a second angle, where the second angle is the angle formed by the intersection of the second disc major axis with a line taken from second disc hub surface at the second disc helical ridge starting position to the center of the second disc hub; and the first angle is not equal to the second angle.

13. A disc for use in a disc screen, the disc having a longitudinal axis, the disc comprising:

a hub extending a length along the longitudinal axis, wherein the longitudinal axis is coaxial with the center of the hub, the hub further comprising:

a hub surface;

a plurality of lobes N, wherein each lobe extends along the longitudinal axis, and wherein each lobe has a peak with a corresponding peak radius measured from the center of the hub to the hub surface at the peak;

each lobe has a peak radius that is substantially the same as the peak radius of the other lobes;

each lobe peak is 360/N degrees apart from one another, as defined by the angles formed between the peak radius of adjacent lobes;

a non-peak radius measured from the center of the hub to the hub surface between the peaks of adjacent lobes;

wherein the peak radius is larger than the non-peak radius; and a helical ridge structure extending away from the hub surface and twisting about the longitudinal axis for the length and wherein the helical ridge structure twists at least 360 degrees about the longitudinal axis.

14. The disc of claim 13, wherein the helical ridge extends away from the hub surface at a height, and the height is constant for the length of the helical ridge.

15. The disc of claim 13, wherein N is an integer in the range from 2 to 6.

16. The disc of claim 13, wherein the disc is split and is comprised of multiple parts.

17. The disc of claim 16, wherein the multiple parts are identical and joined in a staggered configuration.

18. A disc screen comprising;

a first and second adjacent disc, each disc comprising:

a hub extending a length along the longitudinal axis, wherein the longitudinal axis is coaxial with the center of the hub, the hub further comprising:

a hub surface;

a plurality of lobes N, wherein each lobe extends along the longitudinal axis, and wherein each lobe has a peak with a corresponding peak radius measured from the center of the hub to the hub surface at the peak;

each lobe has a peak radius that is substantially the same as the peak radius of the other lobes;

each lobe peak is 360/N degrees apart from one another, as defined by the angles formed between the peak radius of adjacent lobes;

a non-peak radius measured from the center of the hub to the hub surface between the peaks of adjacent lobes;

wherein the peak radius is larger than the non-peak radius; and a helical ridge structure extending away from the hub surface and twisting about the longitudinal axis for the length and wherein the helical ridge structure twists at least 360 degrees about the longitudinal axis;

wherein the helical ridge structure from the first disc is interleaved with the helical ridge structure of the second disc, and the first disc is positioned out of phase from the second disc by:

90 degrees if N is even;

0 degrees if N is odd; and an outer surface of the helical disc of the first disc forms a gap width with the hub surface of the second disc, and when the two discs are rotated in the same direction, the width of the gap is substantially constant.

19. The disc screen of claim 18, wherein the position of the gap moves along the direction of the longitudinal axis of the first disc.

20. The disc screen of claim 18, wherein the position of the gap relative to the center of the hub of the first disc is not substantially constant.

21. The disc screen of claim 18, wherein the helical ridge for each disc extends away from the hub surface at a height, and the height is constant for the length of the helical ridge.

22. The disc screen of claim 18, wherein the first and second discs are each split and comprised of multiple parts.

23. The disc of claim 22, wherein the multiple parts are identical and joined in a staggered configuration.

24. The disc screen of claim 18, wherein:
- the starting position of the helical ridge of the first disc is at a first angle, where the first angle is the angle formed by the intersection of the first disc peak radius with a line taken from first disc hub surface at the first disc helical ridge starting position to the center of the first disc hub;
- the starting position of the helical ridge of the second disc is at a second angle, where the second angle is the angle formed by the intersection of the second disc peak radius with a line taken from second disc hub surface at the second disc helical ridge starting position to the center of the second disc hub; and
- the first angle is not equal to the second angle.

* * * * *